United States Patent
Yeo et al.

(10) Patent No.: US 11,785,566 B2
(45) Date of Patent: Oct. 10, 2023

(54) SYNCHRONIZATION METHOD AND DEVICE FOR GROUP CASTING IN WIRELESS COMMUNICATION SYSTEM

(71) Applicant: Samsung Electronics Co., Ltd., Suwon-si (KR)

(72) Inventors: Jeongho Yeo, Suwon-si (KR); Jinyoung Oh, Suwon-si (KR); Younsun Kim, Suwon-si (KR); Sungjin Park, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 17/051,301

(22) PCT Filed: Apr. 23, 2019

(86) PCT No.: PCT/KR2019/004883
§ 371 (c)(1),
(2) Date: Oct. 28, 2020

(87) PCT Pub. No.: WO2019/212181
PCT Pub. Date: Jul. 11, 2019

(65) Prior Publication Data
US 2021/0243711 A1    Aug. 5, 2021

(30) Foreign Application Priority Data

May 3, 2018   (KR) .................. 10-2018-0051470

(51) Int. Cl.
*H04W 56/00*   (2009.01)
*H04L 1/00*    (2006.01)
(Continued)

(52) U.S. Cl.
CPC ....... *H04W 56/0015* (2013.01); *H04L 1/0063* (2013.01); *H04W 4/08* (2013.01); *H04W 4/46* (2018.02)

(58) Field of Classification Search
None
See application file for complete search history.

(56) References Cited

U.S. PATENT DOCUMENTS 9,154,922 B2 * 10/2015 Kim ................. H04L 1/0029
11,057,854 B2 *  7/2021 Nguyen ........... H04W 56/0015
(Continued)

FOREIGN PATENT DOCUMENTS

KR   10-2010-0098675 A   9/2010
KR   10-2015-0006373 A   1/2015
(Continued)

OTHER PUBLICATIONS

Itri, "Solution for ProSe group communication beyond E-UTRAN coverage", 3GPP Draft, S2-132828, SA WG2 Meeting S2#98, Jul. 15, 2013-Jul. 19, 2013, Valencia, Spain, XP050726202, Jul. 18, 2013.

(Continued)

*Primary Examiner* — Nicholas Sloms
(74) *Attorney, Agent, or Firm* — Jefferson IP Law, LLP

(57) ABSTRACT

Provided are a synchronization method and device for groupcast, and a synchronization method of a terminal for groupcast in a wireless communication system includes: detecting a synchronization signal transmitted by a leader terminal in a group by using group identification information; and receiving system information of the group transmitted by the leader terminal.

17 Claims, 22 Drawing Sheets

(51) Int. Cl.
*H04W 4/08* (2009.01)
*H04W 4/46* (2018.01)

(56) References Cited

U.S. PATENT DOCUMENTS

| | | | |
|---|---|---|---|
| 11,076,316 B2* | 7/2021 | Dai | H04W 72/12 |
| 2009/0310570 A1 | 12/2009 | Smith | |
| 2010/0323637 A1 | 12/2010 | Roman et al. | |
| 2013/0215842 A1* | 8/2013 | Han | H04B 7/0452 |
| | | | 370/329 |
| 2014/0328329 A1 | 11/2014 | Novlan et al. | |
| 2014/0369443 A1 | 12/2014 | Roman et al. | |
| 2015/0009949 A1* | 1/2015 | Khoryaev | H04L 5/0007 |
| | | | 370/329 |
| 2015/0011230 A1 | 1/2015 | Noh et al. | |
| 2015/0043545 A1* | 2/2015 | Cheng | H04W 56/0005 |
| | | | 370/336 |
| 2015/0049684 A1 | 2/2015 | Kim et al. | |
| 2015/0131568 A1* | 5/2015 | You | H04W 72/042 |
| | | | 370/329 |
| 2015/0215767 A1* | 7/2015 | Siomina | H04W 8/02 |
| | | | 455/435.2 |
| 2017/0070312 A1* | 3/2017 | Yi | H04W 4/06 |
| 2017/0078998 A1 | 3/2017 | Li | |
| 2017/0208153 A1* | 7/2017 | Li | H04L 27/2603 |
| 2018/0199388 A1* | 7/2018 | Tabet | H04W 56/0095 |
| 2018/0352525 A1* | 12/2018 | Li | H04B 7/18528 |
| 2019/0052436 A1* | 2/2019 | Desai | H04L 5/0055 |
| 2019/0058620 A1* | 2/2019 | Liu | H04L 5/0053 |
| 2019/0097751 A1* | 3/2019 | Li | H04W 56/00 |
| 2019/0190654 A1* | 6/2019 | You | H04L 5/0007 |
| 2019/0268866 A1* | 8/2019 | Qu | H04L 27/2655 |
| 2020/0029302 A1* | 1/2020 | Cox | H04W 68/02 |
| 2020/0068517 A1* | 2/2020 | Shi | H04L 5/0094 |
| 2020/0092685 A1* | 3/2020 | Fehrenbach | H04W 4/46 |
| 2020/0092846 A1* | 3/2020 | Deng | H04B 7/0695 |
| 2020/0120634 A1* | 4/2020 | Lee | H04W 48/10 |
| 2020/0187034 A1* | 6/2020 | Kuang | H04L 5/0048 |
| 2021/0105789 A1* | 4/2021 | Freda | H04W 4/40 |
| 2021/0243711 A1* | 8/2021 | Yeo | H04L 1/0063 |

FOREIGN PATENT DOCUMENTS

| | | |
|---|---|---|
| KR | 10-2016-0003257 A | 1/2016 |
| KR | 10-2016-0148007 A | 12/2016 |

OTHER PUBLICATIONS

European Search Report dated Jun. 1, 2021, issued in European Patent Application No. 19797051.0.
International Search Report and Written Opinion dated Jul. 30, 2019, issued in International Patent Application No. PCT/KR2019/004883.
Korean Office Action dated Jun. 20, 2022, issued in Korean Patent Application No. 10-2018-0051470.
Korean Decision to Refuse dated Dec. 8, 2022, issued in Korean Patent Application No. 10-2018-0051470.
European Office Action dated Jan. 30, 2023, issued in European Patent Application No. 19797051.0.
Decision to Refuse dated Apr. 4, 2023, issued in Korean Patent Application no. Oct. 2018-0051470.

* cited by examiner

CHANNEL CODING BLOCK DIAGRAM WHEN OUTER CODE IS NOT USED

CHANNEL CODING BLOCK DIAGRAM WHEN OUTER CODE IS USED within gNB coverage out of gNB coverage

SYNCHRONIZATION METHOD AND DEVICE FOR GROUP CASTING IN WIRELESS COMMUNICATION SYSTEM

TECHNICAL FIELD

The present disclosure relates to a wireless communication system and relates to a synchronization method and device for groupcast. More particularly, the present disclosure relates to a method and device for transmitting a signal only to a terminal in a same group or receiving a signal only from a terminal in a same group.

BACKGROUND ART

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and applied to the NR system, for example: beamforming, massive multiple-input multiple-output (massive MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, 5G communication such as sensor networks, M2M communication, MTC, etc., are being implemented by using techniques such as beam-forming, MIMO, array antennas, etc. The application of Cloud-RAN as a big data processing technology described above may be an example of convergence of 5G communication technology and IoT technology.

As described above, various services are able to be provided due to the development of mobile communication systems, and thus, there is need for methods of effectively providing such services.

DESCRIPTION OF EMBODIMENTS

Technical Solution to Problem

The embodiments provide a device and method for effectively providing a service in a mobile communication system.

Advantageous Effects of Disclosure

According to the embodiments, a service can be effectively provided in a mobile communication system.

BEST MODE

Figure 1:
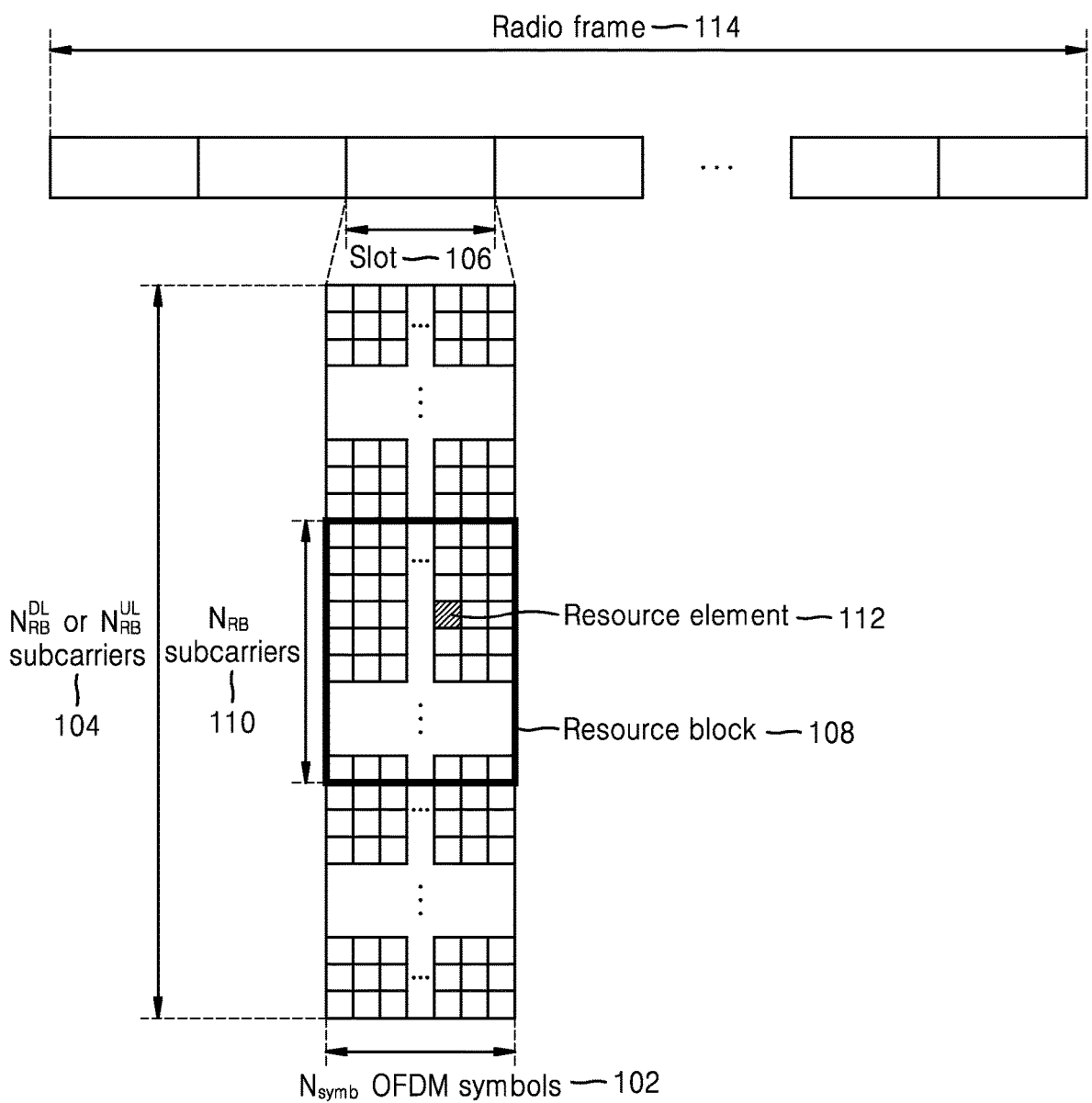
FIG. 1 is a diagram showing a transmission structure of a time-frequency resource region that is a radio resource region of a 5th generation (5G) or new radio (NR) system.

According to an embodiment, a synchronization method of a terminal for groupcast in a wireless communication system includes: detecting a synchronization signal transmitted by a leader terminal in a group by using group identification information; and receiving system information of the group transmitted by the leader terminal.

According to another embodiment, a terminal for groupcast in a wireless communication system includes: a transceiver; at least one memory storing a program for synchronization of the terminal for the groupcast in the wireless communication system; and at least one processor configured to execute the program to detect a synchronization signal transmitted by a leader terminal in a group by using group identification information and receive system information of the group transmitted by the leader terminal.

MODE OF DISCLOSURE

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a 5th generation (5G) or new radio (NR) communication standards are being developed with 5G wireless communication systems.

In a 5G or NR system, which is a representative example of a broadband wireless communication system, a downlink (DL) and an uplink (UL) employ an orthogonal frequency division multiplexing (OFDM) method. In particular, the DL employs a cyclic-prefix OFDM (CP-OFDM) method and the UL employs a discrete Fourier transform spreading OFDM (DFT-S-OFDM) method in addition to CP_OFDM method. The UL refers to a radio link through which a terminal (a user equipment (UE) or a mobile station (MS)) transmits data or a control signal to a base station (BS) (e.g., a next generation node B (gNB)), and the DL refers to a radio link through which a BS transmits data or a control signal to a terminal. In such a multiple access scheme, data or control information of each user is classified by generally assigning and operating the data or control information such that time-frequency resources for transmitting data or control information for each user do not overlap each other, that is, such that orthogonality is established.

The 5G or NR system employs a hybrid automatic repeat request (HARQ) scheme in which a physical layer retransmits data when a decoding failure occurs in initial transmission. In the HARQ scheme, when a receiver fails to accurately decode data, the receiver transmits information (Negative Acknowledgment (NACK)) indicating the decoding failure to the transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

Terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources of a terminal, and may be at least one of a gNB, an evolved node B (eNB), a node B (NB), a base station (BS), a wireless access unit, a base station controller, or a node on a network. Examples of a terminal may include a UE, an MS, a cellular phone, a smartphone, a computer, a multimedia system capable of performing a communication function, or the like. In the present disclosure, a DL is a wireless transmission path of a signal transmitted from a base station to a terminal, and a UL is a wireless transmission path of a signal transmitted from a terminal to a base station. Also, hereinbelow, embodiments of the present disclosure will be described with an example of the 5G and NR systems, but the embodiments of the present disclosure may also be applied to other communication systems having a similar technical background or channel form. Also, it will be understood by one of ordinary skill in the art that the embodiments of the present disclosure may be applied to other communication systems through some modifications without departing from the scope of the present disclosure.

In the present disclosure, the general terms of a physical channel and a signal may be used interchangeably with data or a control signal. For example, a physical DL shared channel (PDSCH) is a physical channel where data is transmitted, but in the present disclosure, PDSCH may be data.

Hereinafter, higher signaling of the present disclosure is a method of transmitting a signal from a base station to a terminal by using a DL data channel of a physical layer or from a terminal to a base station by using an UL data channel of a physical layer, and may also be referred to as radio resource control (RRC) signaling or medium access control (MAC) control element (CE).

An NR access technology system, i.e., a new 5G communication system, has been designed such that various services are freely multiplexed in time and frequency resources, and accordingly, waveform/numerology, a reference signal, and the like may be dynamically or freely assigned according to necessity of a corresponding service. To provide an optimum service to a terminal in wireless communication, data transmission optimized via measurement of quality and interference of a channel is important, and thus channel state measurement is mandatory. However, unlike 4G communication in which channel and interference characteristics do not largely change depending on a frequency resource, channel and interference characteristics of a 5G or NR channel largely change depending on a service, and thus a subset of a frequency resource group (FRG) needs to be supported to divide and measure services. In the 5G or NR system, types of supported services may be divided in categories of enhanced mobile broadband (eMBB), massive machine type communications (mMTC), and ultra-reliable and low-latency communications (URLLC). The eMBB may be a service aiming at high-speed transmission of high capacity data, the mMTC may be a service aiming at terminal power minimization and multiple terminal connections, and the URLLC may be a service aiming at high reliability and low delay. Different requirements may be applied depending on types of services applied to a terminal.

In a wireless communication system, in particular, the 5G or NR systems, multicast or groupcast may be supported between terminals or between a base station and a terminal. In a method of supporting groupcast, a control signal, a data signal, and the like may be transmitted using group information enabling only terminals corresponding to a specific group to receive the control signal, the data signal, and the like.

In an environment with many groups around, a specific terminal may receive a signal from all groups around. For example, the specific terminal may search for a synchronization signal from all groups and decode information signals of corresponding groups. As a result, the number of decoding of the specific terminal may be increased. Thus, the present disclosure provides a method and apparatus for preventing detection unless information is related to the specific terminal during synchronization and group information decoding processes such that subsequent signal reception is not required.

According to the present disclosure, the terminal that searches for the synchronization signal in a sidelink (SL) needs to detect SL synchronization signals from all terminals possible. At this time, the terminal may detect only a synchronization signal transmitted by a terminal of a group to which the terminal is to belong, and reduce the number of attempted decoding by detecting only data of a corresponding group with respect to detection of data including system information to be received later.

FIG. 1 is a diagram showing a transmission structure of a time-frequency resource region that is a radio resource region of a 5G or NR system.

In FIG. 1, a horizontal axis represents a time domain and a vertical axis represents a frequency domain in a radio resource region. A minimum transmission unit in the time domain is an OFDM symbol and $N_{symb}$ OFDM symbols 102 configure one slot 106. A length of a subframe may be defined to be 1.0 ms and a radio frame 114 may be defined to be 10 ms. A minimum transmission unit in the frequency domain is a subcarrier and a bandwidth of a whole system transmission bandwidth may include total $N_{BW}$, i.e., $N_{RB}^{DL}$ or $N_{RB}^{UL}$ subcarriers 104. However, such specific numerical values may vary according to a system.

A base unit of resources in the time and frequency domains is a resource element (RE) 112, and may be indicated as an OFDM symbol index and a subcarrier index. A resource block (RB) 108 or a physical resource block (PRB) is defined as $N_{symb}$ successive OFDM symbols 102 in the time domain and $N_{RB}$ successive subcarriers 110 in the frequency domain. Accordingly, one RB 108 may be composed of $N_{symb} \times N_{RB}$ REs 112.

In general, a minimum transmission unit of data is an RB unit. In the 5G or NR system, $N_{symb}$=14 and $N_{RB}$=12 in general, and $N_{BW}$ and $N_{RB}$ may be proportional to the bandwidth of the system transmission bandwidth. A data rate may be increased in proportion to the number of RBs being scheduled to a terminal. In the 5G or NR system, in the case of a frequency division duplex (FDD) system that divides and operates a DL and a UL through a frequency, the transmission bandwidth of the DL and the transmission bandwidth of the UL may differ from each other. A channel bandwidth indicates a radio frequency (RF) bandwidth that corresponds to the system transmission bandwidth. Table 1 below shows a corresponding relationship between a system transmission bandwidth and a channel bandwidth defined in a long-term evolution (LTE) system that is a 4G wireless communication system before the 5G or NR system. For example, in the LTE system having the channel bandwidth of 10 MHz, the transmission bandwidth may be composed of 50 RBs.

TABLE 1

| Channel Bandwidth $BW_{channel}$ [MHz] | 1.4 | 3 | 5 | 10 | 15 | 20 |
|---|---|---|---|---|---|---|
| Transmission Bandwidth Configuration $N_{RB}$ | 6 | 15 | 25 | 50 | 75 | 100 |

The 5G or NR system may operate in the channel bandwidth wider than that of the LTE system shown in Table 1.

In the 5G or NR system, scheduling information on DL data or UL data is transferred from a base station to a terminal through DL control information (DCI). The DCI is defined according to various formats, and may indicate, according to each format, whether the scheduling information is UL data scheduling information (UL grant) or DL data scheduling information (DL grant), whether the DCI is compact DCI having a small size of control information, whether spatial multiplexing using multiple antennas is applied, or whether the DCI is DCI for controlling power. For example, DCI format 1-1 that is the scheduling control information (DL grant) of the DL data may include at least the following control information.

Carrier Indicator: Indicates on which frequency carrier the DL data is transmitted.

DCI Format Indicator: An indicator for distinguishing whether the DCI is for DL or UL.

Bandwidth Part (BWP) Indicator: Indicates on which BWP the DL data is transmitted.

Frequency Domain Resource Assignment: Indicates an RB of a frequency domain assigned to data transmission. An expressed resource is determined in accordance with a system bandwidth and a resource assignment method.

Time Domain Resource Assignment: Indicates from which OFDM symbol of which slot a data-related channel is to be transmitted.

Virtual RB (VRB)-to-PRB Mapping: Indicates how to map an VRB index and a PRB.

Modulation and Coding Scheme (MCS): Indicates a modulation scheme and a coding rate used for data transmission. In other words, the MCS may indicate a coding rate value for indicating a transport block size (TB S) and channel coding information, together with information on quadrature phase shift keying (QPSK), 16 quadrature amplitude modulation (16QAM), 64QAM, or 256QAM.

Code Block Group (CBG) Transmission Information: Indicates information about which CBG is transmitted when CBG retransmission is configured.

HARQ Process Number: Indicates a process number of HARQ.

New Data Indicator: Indicates whether HARQ transmission is initial transmission or retransmission.

Redundancy Version: Indicates a redundancy version of HARQ.

Transmit Power Control (TPC) command for Physical UL Control Channel (PUCCH): Indicates a transmission power control command for a PUCCH that is a UL control channel.

In physical UL shared channel (PUSCH), time domain resource assignment may be transmitted via information about a slot where PUSCH is transmitted, a start symbol location S from the slot, and a number L of symbols to which PUSCH is mapped. Here, S may be a relative location from a start of the slot, L may be the number of consecutive symbols, and S and L may be determined from a start and length indicator value (SLIV) defined as below.

if (L−1)≤7 then $$SLIV=14 \cdot (L-1)+S$$

else $$SLIV=14 \cdot (14-L+1)+(14-1-S)$$

where 0<L≤14−S

In the 5G or NR system, a table in which one row includes an SLIV value, a PUSCH mapping type, and information about a slot where PUSCH is transmitted may be generally configured via RRC configuration. Then, in the time domain resource assignment of DCI, a base station may transmit, to a terminal, an SLIV value, a PUSCH mapping type, and information about a slot where PUSCH is transmitted by indicating an index value in the configured table.

In the 5G or NR system, a type A and a type B are defined as the PUSCH mapping type. In the PUSCH mapping type A, a first symbol among demodulation reference signal (DMRS) symbols is located in a second or third OFDM symbol in a slot. In the PUSCH mapping type B, a first symbol among DMRS symbols is located in a first OFDM symbol in a time domain resource assigned via PUSCH transmission.

The DCI may be transmitted on a physical DL control channel (PDCCH) (or control information, hereinafter interchangeably used) via channel coding and modulation processes.

In general, the DCI is scrambled by a specific radio network temporary identifier (RNTI) (or terminal identifier) independently with respect to each terminal, is added with a cyclic redundancy check (CRC), is channel-coded, and then is configured as an independent PDCCH to be transmitted. The PDCCH is mapped and transmitted to the terminal on a control resource set (CORESET).

The DL data may be transmitted through a physical downlink shared channel (PDSCH) that is a physical channel for transmitting the DL data. The PDSCH may be transmitted after a control channel transmission interval, and scheduling information, such as a concrete mapping location or a modulation scheme in the frequency domain, may be determined based on the DCI to be transmitted through the PDCCH.

The base station notifies the terminal of a modulation scheme applied to the PDSCH to be transmitted and a transport block size (TBS) to be transmitted, by using an MCS among the control information constituting the DCI. According to an embodiment, the MCS may be composed of 5 bits, or may be composed of bits less than or greater than 5 bits. The TBS corresponds to the size before channel coding for error correction is applied to the transport block (TB) to be transmitted by the base station.

In the present disclosure, TB may include an MAC header, an MAC CE, and one or more MAC service data units (SDUs), and padding bits. Alternatively, the TB may indicate a data unit or an MAC protocol data unit (PDU) from an MAC layer to a physical layer.

The modulation scheme supported in the 5G or NR system is QPSK, 16QAM, 64QAM, or 256QAM and respective modulation orders ($Q_m$) correspond to 2, 4, 6, and 8. In other words, 2 bits per symbol may be transmitted in QPSK, 4 bits per symbol may be transmitted in 16QAM, 6 bits per symbol may be transmitted in 64QAM and 8 bits per symbol may be transmitted in 256QAM.

Figure 2:
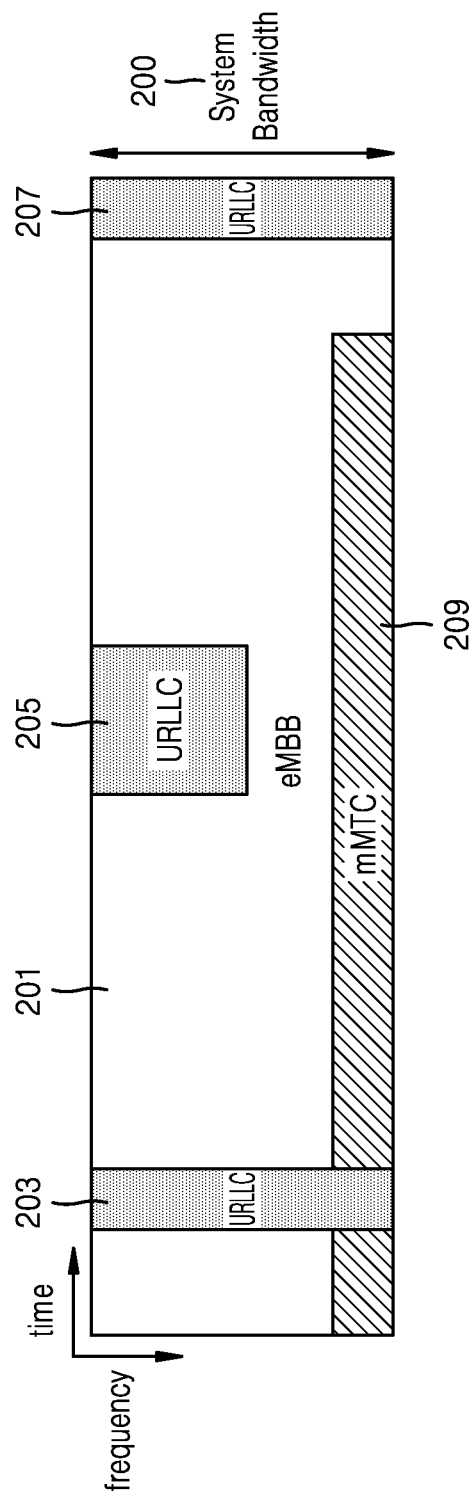
FIG. 2 is a diagram for describing a method of assigning enhanced mobile broadband (eMBB), ultra-reliable and low-latency communication (ULLLC), and massive machine type communication (mMTC) data to a frequency-time resource region in a 5G or NR system, according to an embodiment.

FIG. 2 is a diagram for describing a method of assigning eMBB, ULLLC, and mMTC data to a frequency-time resource region in a 5G or NR system, according to an embodiment.

Referring to FIG. 2, the eMBB, URLLC, and mMTC data may be assigned in an entire system frequency band 200, according to an embodiment. When pieces of URLLC data 203, 205, and 207 are generated and needed to be transmitted while eMBB data 201 and mMTC data 209 are assigned and transmitted in specific frequency bands, the pieces of URLLC data 203, 205, and 207 may be transmitted without having to empty a portion where the eMBB data 201 and mMTC data 209 are already assigned or transmit the eMBB data 201 and mMTC data 209. Among above-described services, because the pieces of URLLC data 203, 205, and 207 need to have reduced latency, the pieces of URLLC data 203, 205, and 207 may be assigned and transmitted in a portion of a resource where the eMBB data 201 is assigned. When URLLC data is additionally assigned and transmitted in a resource where eMBB data is assigned, the eMBB data may not be transmitted in a redundant frequency-time resource and accordingly, a transmission performance of the eMBB data may be decreased. In this case, transmission failure of the eMBB data may occur due to assignment of the URLLC data.

Figure 3:
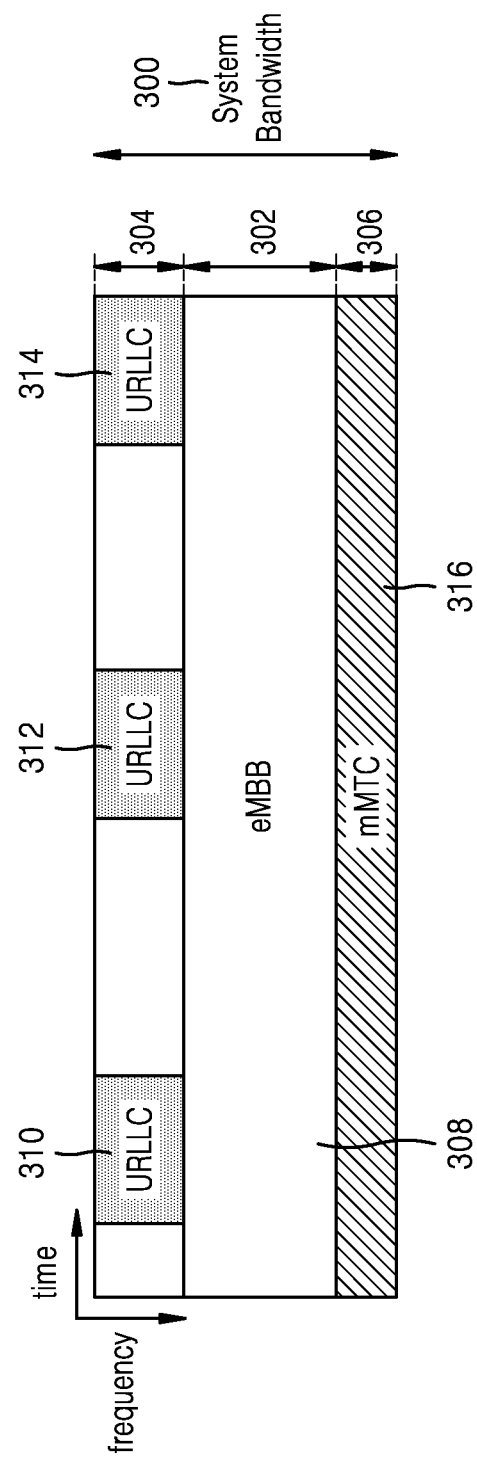
FIG. 3 is a diagram for describing a method of assigning eMBB, ULLLC, and mMTC data to a frequency-time resource region in a 5G or NR system, according to another embodiment.

FIG. 3 is a diagram for describing a method of assigning eMBB, ULLLC, and mMTC data to a frequency-time resource region in a 5G or NR system, according to another embodiment.

Referring to FIG. 3, an entire system frequency band 300 may be divided to be used by each of sub-bands 302, 304, and 306 to transmit a service and data, according to another embodiment. Information related to sub-band configuration may be pre-determined. According to an embodiment, the information may be transmitted from a base station to a terminal via higher signaling. Alternatively, information related to the sub-bands 302, 304, and 306 may be arbitrarily configured by the base station or a network node, and services may be provided to the terminal without having to transmit separate sub-band configuration information. In FIG. 3, the sub-band 302 may be used for eMBB data transmission, the sub-band 304 may be used for URLLC data transmission, and the sub-band 306 may be used for mMTC data transmission.

Throughout embodiments, the length of transmission time interval (TTI) used in URLLC transmission may be shorter than the length of TTI used in eMBB or mMTC transmission. Also, a response of information related to URLLC may be transmitted faster compared to eMBB or mMTC, and accordingly, information may be transmitted or received with low latency. A structure of a physical layer channel used for each type to transmit these three types of services or data may vary. For example, at least one of lengths of transmission time interval (TTI), assignment units of a frequency source, structures of a control channel, and mapping methods of data may be different.

Hereinabove, three types of services and data have been described as an example, but there may be more types of services and data corresponding thereto, and at this time, the contents of the present disclosure may be applied as well.

Terms such as a physical channel and a signal in the 5G or NR system may be used to describe a method and apparatus proposed in embodiments. However, the contents of the present disclosure may also be applied to a wireless communication system other than the 5G or NR system.

Figure 4:
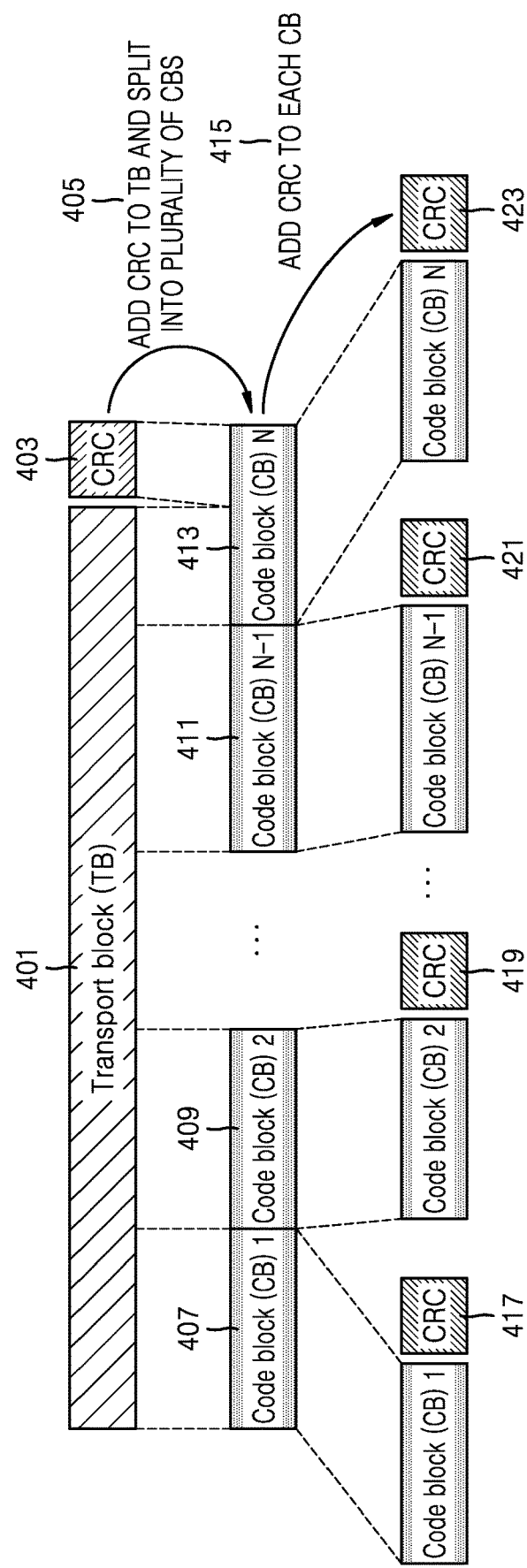
FIG. 4 is a diagram for describing a structure in which one transport block is split into a plurality of code blocks and a cyclic redundancy check (CRC) is added, according to an embodiment.

FIG. 4 is a diagram for describing a structure in which one TB is split into a plurality of code blocks and a CRC is added, according to an embodiment.

Referring to FIG. 4, a CRC 403 may be added to the end or front of one TB 401 to be transmitted from UL or DL. A CRC may have 16 bits, 24 bits, or a pre-fixed number of bits or may have a number of bits varying depending on a channel state, and may be used to determine a success of channel coding. A block to which the TB 401 and the CRC 403 are added may be split into a plurality of code blocks (CBs) 407, 409, 411, and 413 (operation 405). Such CBs 407, 409, 411, and 413 may be split as a maximum size thereof is pre-determined, and in this case, the last CB 413 may have a size smaller than those of other CBs 407, 409, and 411 or may be adjusted to have a same lengths as the other CBs 407, 409, and 411 by inserting 0, a random value, or 1 thereto. CRCs 417, 419, 421, and 423 may be added respectively to the split CBs 407, 409, 411, and 413 (operation 415). Each of the CRCs 417, 419, 421, and 423 may have 16 bits, 24 bits, or a pre-fixed number of bits, and may be used to determine a success of channel coding.

To generate such a CRC 403, the TB 401 and a cyclic generator polynomial may be used, and here, the cyclic generator polynomial may be defined in various methods. For example, when a cyclic generator polynomial for a 24-bit CRC is $g_{CRC24A}(D)=D^{24}+D^{23}+D^{18}+D^{17}+D^{14}+D^{11}+D^{10}+D^7+D^6+D^5+D^4+D^3+D+1$ and L=24, $a_0$, $a_1$, $a_2$, $a_3$, ..., $a_{A-1}$ may be determined to be a value in which the remainder is 0 by dividing $a_0 D^{A+23}+a_1 D^{A+22}+\ldots+a_{A-1}D^{24}+p_0 D^{23}+p_1 D^{22}+\ldots+p_{22}D^1+p_{23}$ by $g_{CRC24A}(D)$ regarding CRCs $p_0$, $p_1$, $p_2$, $p_3$, ..., $p_{L-1}$ for TB data $p_0$, $p_1$, $p_2$, $p_3$, ..., $p_{L-1}$. Here, an example in which a CRC length L is 24 has been described, but the CRC length may be determined to be any length, such as 12, 16, 24, 32, 40, 48, or 64. As described above, after adding the CRC 403 to the TB 401 through such processes, and the TB 401 may be split into N CBs 407, 409, 411, and 413. The CRCs 417, 419, 421, and 423 may be respectively added to the CBs 407, 409, 411, and 413 (operation 415). The CRCs 417, 419, 421, and 423 respectively added to the CBs 407, 409, 411, and 413 may use another cyclic generator polynomial or a CRC having a length different from when the CRC 403 added to the TB 401 is generated. However, the CRC 403 added to the TB 401 and the CRCs 417, 419, 421, and 423 added to CBs may be omitted depending on a type of a channel code to be applied to a CB. For example, the CRCs 417, 419, 421, and 423 to be inserted for each CB may be omitted when a low-density parity-check (LDPC) code is applied to the CB instead of a turbo block. However, the CRCs 417, 419, 421, and 423 may be added to the CBs even when the LDPC code is applied. Also, a CRC may be added or omitted even when a polar code is used.

As shown in FIG. 4, in a TB to be transmitted, a maximum length of one CB is determined depending on a type of applied channel coding, and the TB and a CRC added to the TB are split into CBs according to the maximum length of the CB. In an LTE system, a CRC for CB is added to a CB, a data bit and a CRC of the CB are encoded in a channel code and thus coded bits are determined, and a number of rate-matching bits is determined as pre-agreed for each of the coded bits.

Figure 5:
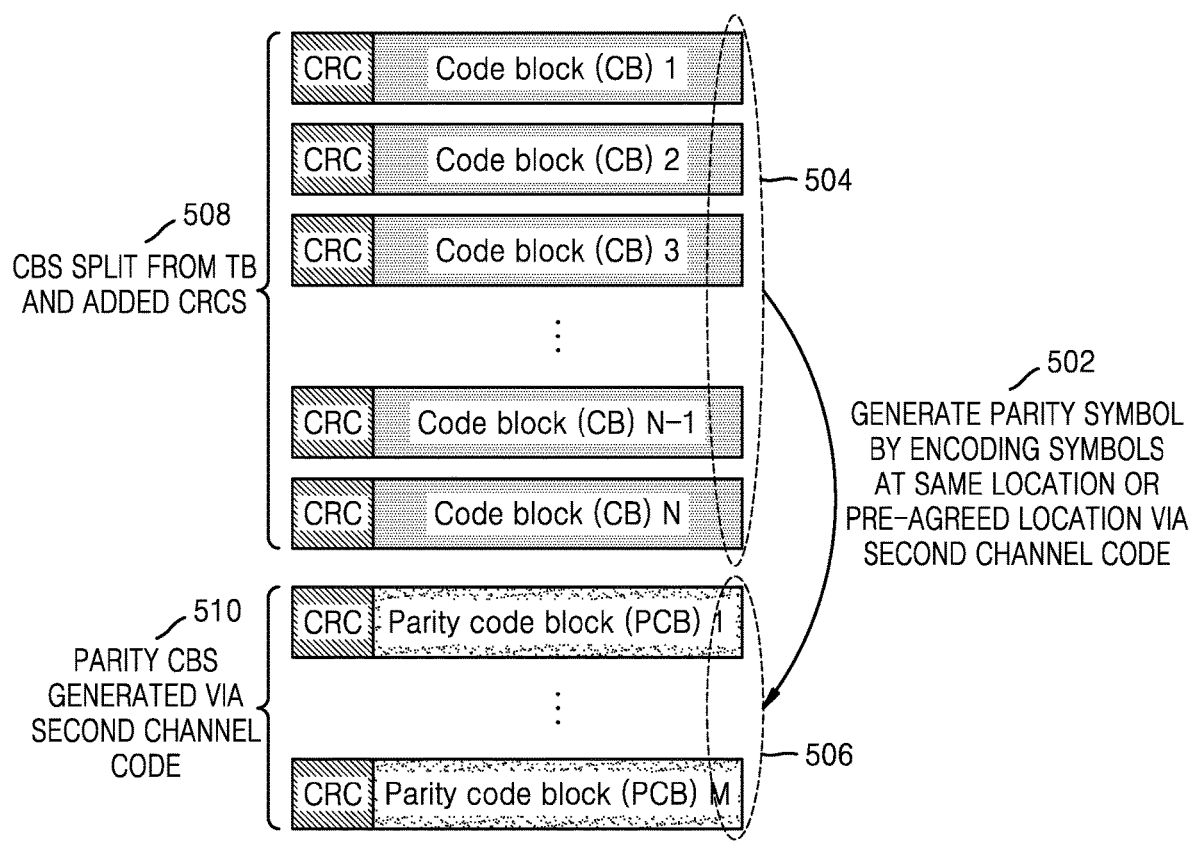
FIG. 5 is a diagram for describing a structure of coding by applying an outer code, according to an embodiment.
Figure 6:
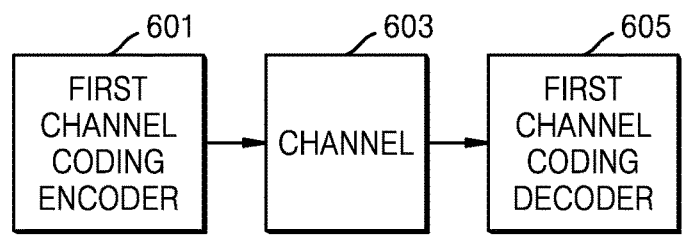
FIG. 6 show diagrams of operation processes based on whether an outer code is applied, according to an embodiment.
Figure 6:
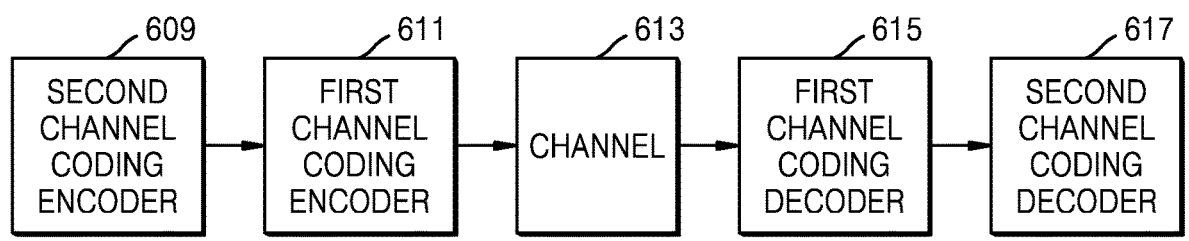

FIG. 5 is a diagram for describing a structure of coding by applying an outer code, according to an embodiment, and FIG. 6 show diagrams of operation processes based on whether an outer code is applied, according to an embodiment.

Referring to FIGS. 5 and 6, a method of transmitting a signal by using an outer code will be described.

Referring to FIG. 5, after one TB is split into a plurality of CBs, parity bits or symbols 506 may be generated as bits or symbols 504 at same locations in the CBs are encoded via a second channel code (operation 502). Then, CRCs may be added respectively to CBs and parity CBs generated via second channel code encoding (operations 508 and 510). Addition of a CRC may vary depending on a type of a channel code. For example, when a turbo code is used as a first channel code, the CRCs are added (operations 508 and 510), but thereafter, each of CBs and parity CBs may be encoded via first channel code encoding. In the present disclosure, the first channel code may be, for example, a convolutional code, an LDPC code, a turbo code, or a polar code. However, the first channel code is not limited thereto and various channel codes may be applied. In the present disclosure, the second channel code may be, for example, a Reed-Solomon code, a BCH code, a Raptor code, or a parity bit generation code. However, the second channel code is not limited thereto and various channel codes may be applied.

Referring to FIG. 6, when an outer code is used, data to be transmitted passes through a second channel coding encoder 609. Bits or symbols that passed through the second channel coding encoder 609 as such pass through a first channel coding encoder 611. When channel-coded symbols are received by a receiver by passing through a channel 613, the receiver may sequentially operate a first channel coding decoder 615 and a second channel coding decoder 617, based on a received signal. The first channel coding decoder 615 and the second channel coding decoder 617 may perform operations corresponding respectively to the first channel coding encoder 611 and the second channel coding encoder 609.

In channel coding processes where an outer code is not used, only a first channel coding encoder 601 and a first channel coding decoder 605 are used by a transceiver and a second channel coding encoder and a second channel coding decoder are not used. Even when the outer code is not used, the first channel coding encoder 601 and the first channel coding decoder 605 may be configured in the same manner as when the outer code is used.

Figure 7:
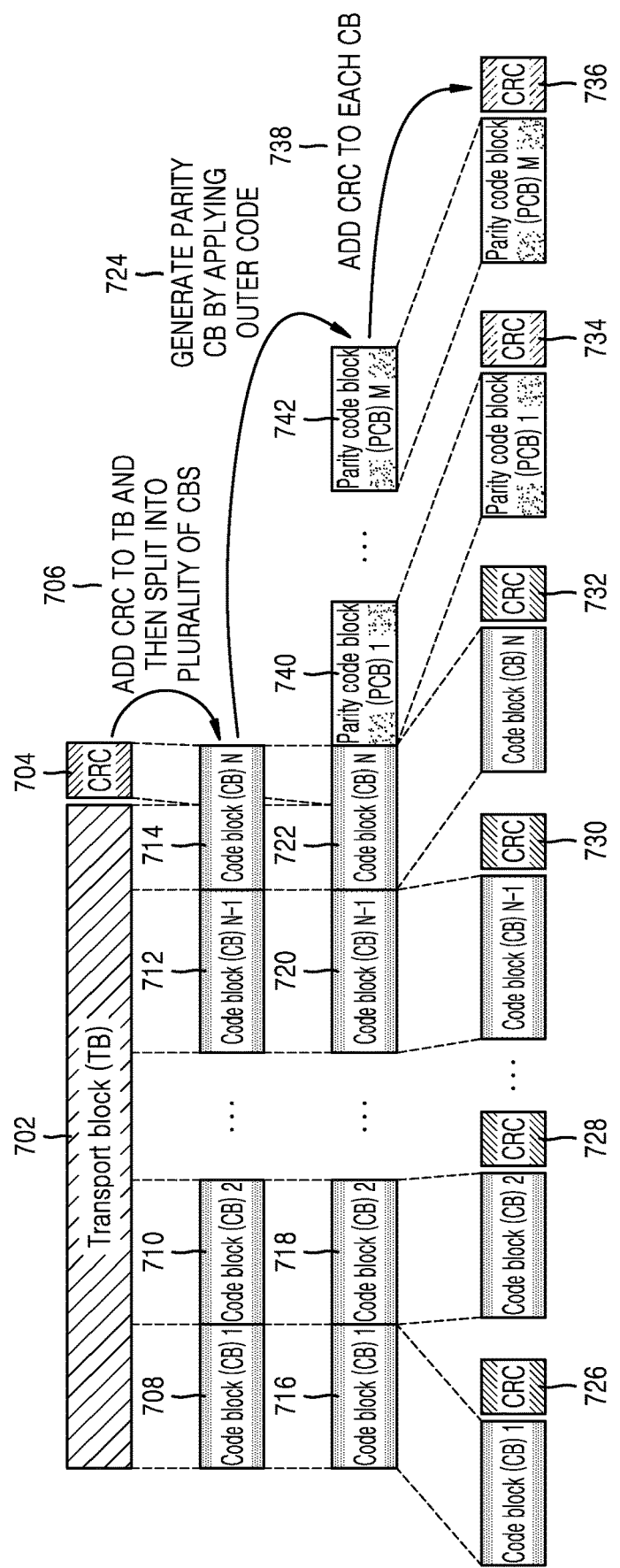
FIG. 7 is a diagram for describing a structure in which one transport block is split into a plurality of code blocks and a parity code block is generated by applying an outer code, according to an embodiment.

FIG. 7 is a diagram for describing a structure in which one TB is split into a plurality of CBs and a parity CB is generated by applying an outer code, according to an embodiment.

Referring to FIG. 7, an embodiment in which one TB is split into several CBs and then one or more parity CBs are generated as a second channel code or an outer code is applied is shown. As described above with reference to FIG. 4, one TB may be split into one or more CBs. Here, when only one CB is generated according to a size of the TB, a CRC may not be added to the corresponding CB. When the outer code is applied to the CBs to be transmitted, parity CBs 740 and 742 may be generated (operation 724). When the outer code is used, the parity CB may be located at the end of a last CB (operation 724). After the outer code, CRCs 726, 728, 730, 732, 734, and 736 may be added (operation 738). Then, each CB and parity CB may be encoded via a channel code, together with a CRC.

In embodiments below, a method and apparatus for performing data transmission and reception by applying an outer code between a base station and a terminal or between terminals will be described. Here, data may be transmitted from one terminal to a plurality of terminals or data may be transmitted from one terminal to another terminal. Alternatively, data may be transmitted from a base station to a plurality of terminals. However, an embodiment is not limited thereto and the present disclosure may be applied to various cases.

Figure 8:
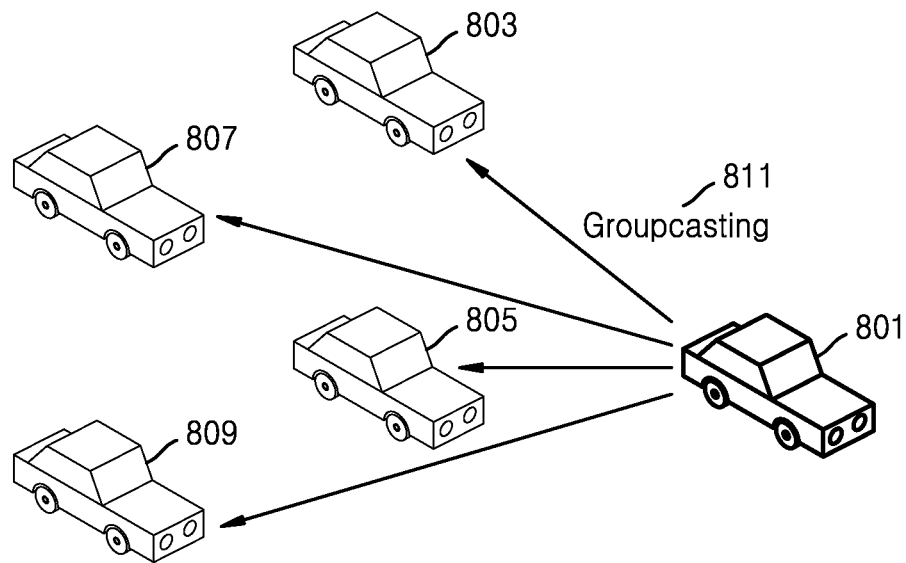
FIG. 8 is a diagram for describing groupcasting in which one terminal transmits common data to a plurality of terminals, according to an embodiment.
Figure 9:
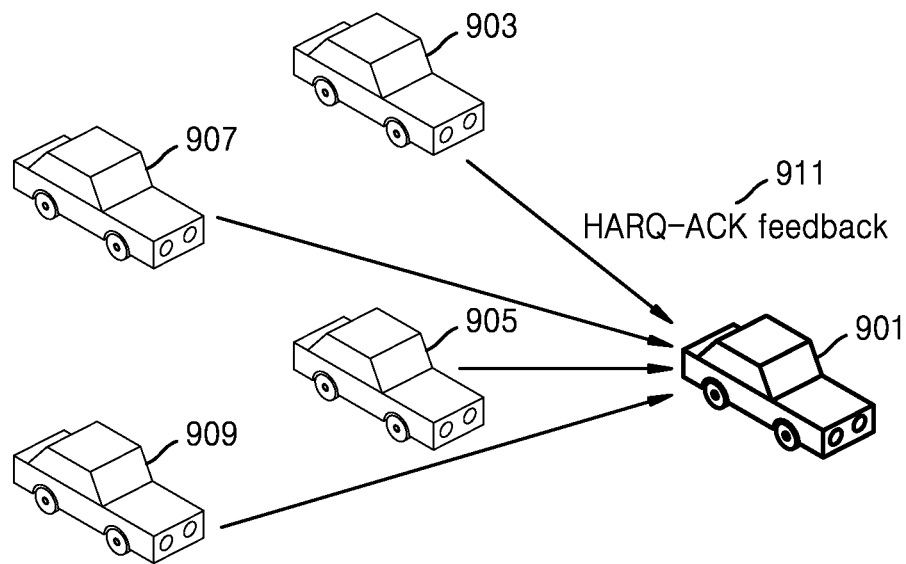
FIG. 9 is a diagram for describing processes in which terminals that received common data via groupcasting transmit, to a terminal that transmitted data, information related to data reception success or data reception failure, according to an embodiment.

FIG. 8 is a diagram for describing groupcasting in which one terminal transmits common data to a plurality of terminals, according to an embodiment, and FIG. 9 is a diagram for describing processes in which terminals that received common data via groupcasting transmit, to a terminal that transmitted data, information related to data reception success or data reception failure, according to an embodiment.

Referring to FIG. 8, an example of groupcasting 811 in which one terminal 801 transmits common data to a plurality of terminals 803 through 809 is shown. A terminal may be a moving terminal such as a vehicle. In this case, separate control information, physical control channel, and data transmission may be performed for groupcasting.

Referring to FIG. 9, processes in which terminals 903 through 909 that received common data via groupcasting transmit information related to data reception success or failure to a terminal 901 that transmitted data. Such information may be HARQ-ACK feedback 911.

In the present disclosure, a terminal may be present in various forms, such as a vehicle or a pedestrian.

Figure 10:
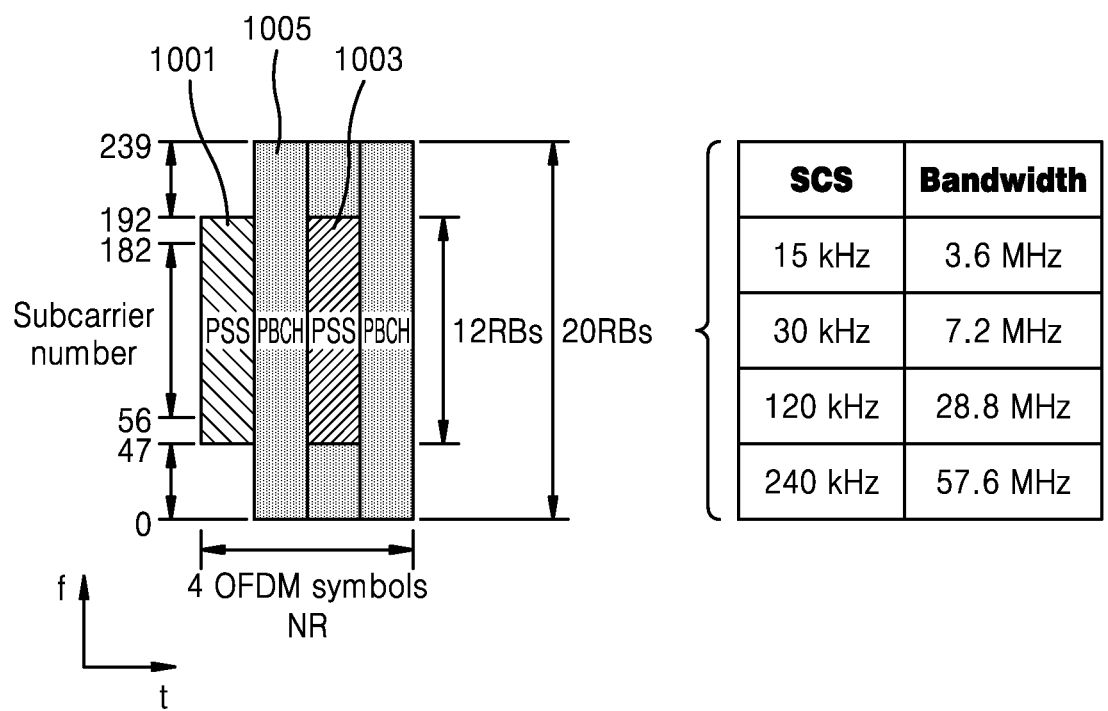
FIG. 10 is a diagram showing a structure in which synchronization signals and a physical broadcast channel (PBCH) of a 5G or NR system are mapped in a time-frequency resource region.

FIG. 10 is a diagram showing a structure in which synchronization signals and a physical broadcast channel (PBCH) of a 5G or NR system are mapped in a time-frequency resource region.

A primary synchronization signal (PSS) 1001, a secondary synchronization signal (SSS) 1003, and PBCH are mapped over 4 OFDM symbols, wherein PSS and SSS are mapped to 12 RBs and PBCH is mapped to 20 RBs. Here, PBCH may include a physical sidelink broadcast channel (PSBCH). A table of FIG. 10 shows how a frequency band of 20 RBs is changed according to subcarrier spacing (SCS). As such, a resource region where PSS, SSS, and PBCH is transmitted may be referred to as a synchronization signal (SS)/PBCH block.

Figure 11:
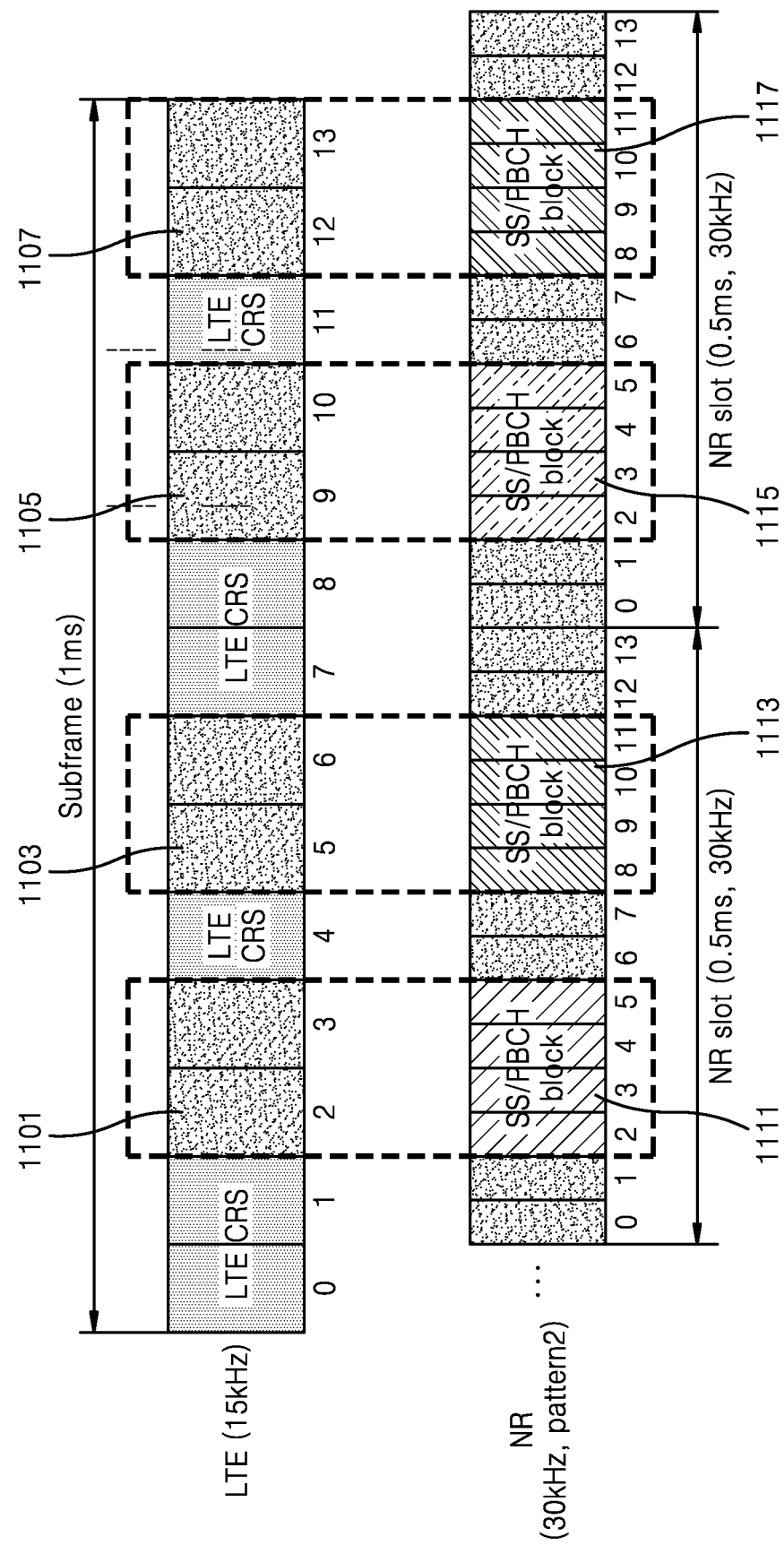
FIG. 11 is a diagram for describing to which symbols in a slot one synchronization signal (SS)/PBCH block is mapped, according to an embodiment.

FIG. 11 is a diagram for describing to which symbols in a slot one SS/PBCH block is mapped, according to an embodiment.

Referring to FIG. 11, examples of an LTE system using SCS of 15 kHz and a 5G or NR system using SCS of 30 kHz are shown. SS/PBCH blocks 1111 through 1117 of the NR system may be transmitted from locations 1101 through 1107 for avoiding cell-specific reference signals (CRSs) always transmitted in the LTE system. Accordingly, the LTE system and the NR system may co-exist in one frequency band.

Figure 12:
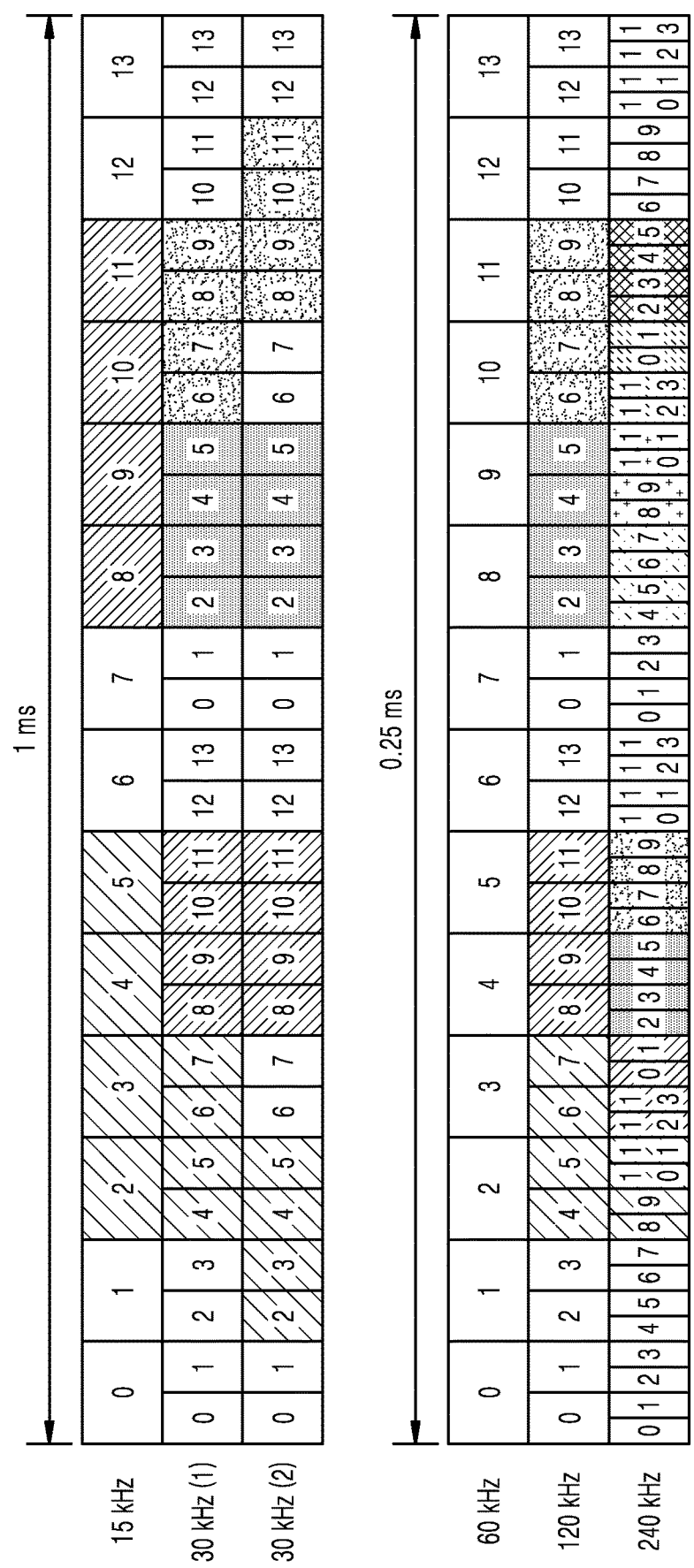
FIG. 12 is a diagram showing to which symbols among symbols within 1 ms an SS/PBCH block is transmittable according to subcarrier spacing, according to an embodiment.
Figure 13:
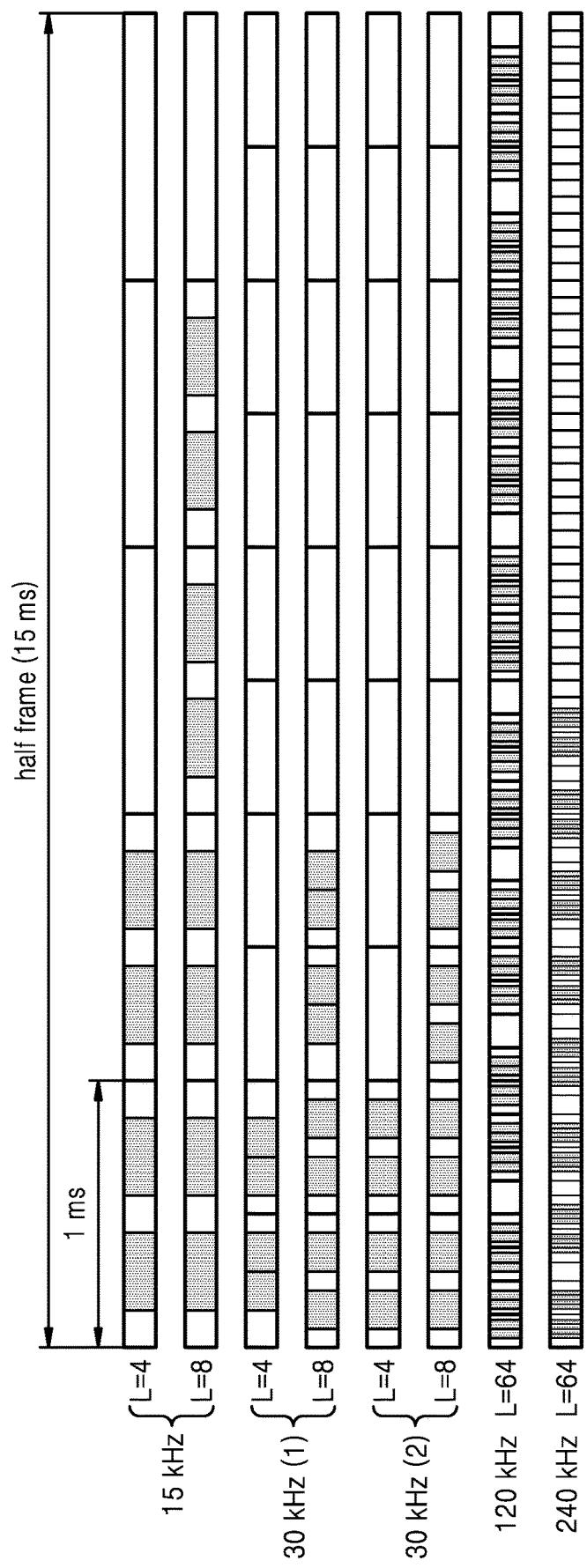
FIG. 13 is a diagram showing to which slot and symbols within 5 ms an SS/PBCH block is transmittable according to subcarrier spacing, according to an embodiment.

FIG. 12 is a diagram showing to which symbols among symbols within 1 ms an SS/PBCH block is transmittable according to SCS, according to an embodiment, and FIG. 13 is a diagram showing to which slot and symbols within 5 ms an SS/PBCH block is transmittable according to SCS, according to an embodiment.

Referring to FIGS. 12 and 13, in a region where the SS/PBCH block is transmittable, the SS/PBCH block is not required to be always transmitted, and may be transmitted or not transmitted depending on selection of a base station.

An intra-group communication method provided by the present disclosure may be applied to a communication scenario such as a platoon. The platoon may be an environment in which a plurality of vehicles move and communicate in a group. For example, when a plurality of trucks move in a specific direction, the trucks may move in a line such that a truck in front transmits information to a truck behind.

In the present disclosure, a group ID is identification information regarding a specific group. A terminal to be included in a specific group may pre-store a group ID of the specific group or may be configured from a base station while being connected to the base station. Alternatively, the group ID may be obtained via a synchronization process with the group or a platoon. The group ID may be a value used at a higher level that may be called Layer 2. For example, the group ID may be a value added in front of MAC data in an MAC layer to indicate a destination of transmission.

According to an embodiment, the terminal may synchronize with another terminal in the specific group and receive system information to communicate with other terminals in the specific group.

Figure 14:
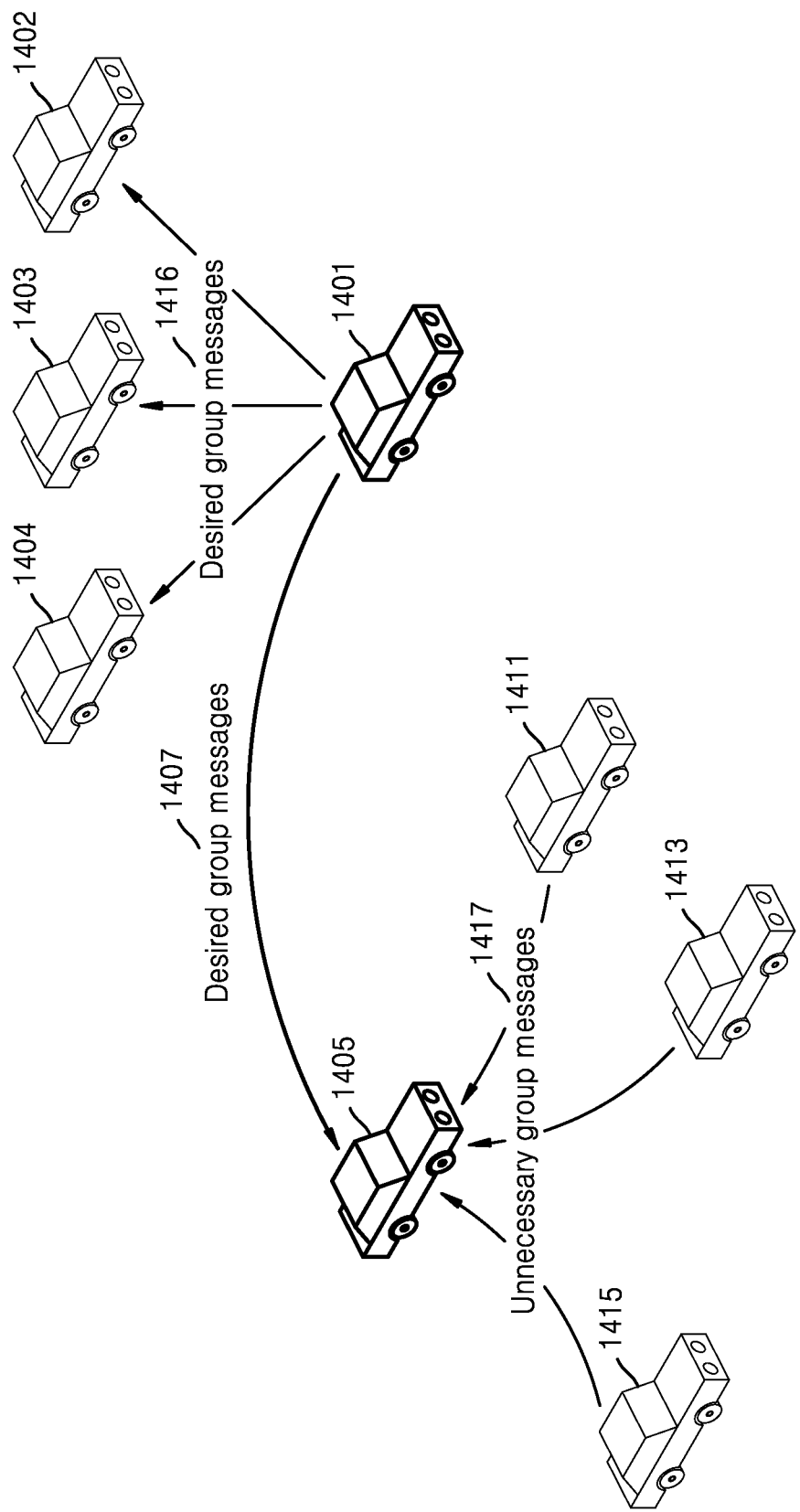
FIG. 14 is a diagram showing a situation in which one terminal according to an embodiment is included, or is to be included, in a specific group in an environment where a plurality of terminals including terminals belonging to the specific group are present.

FIG. 14 is a diagram showing a situation in which one terminal according to an embodiment is included or to be included in a specific group in an environment where a plurality of terminals including terminals belonging to the specific group are present.

Referring to FIG. 14, a situation in which one terminal 1405 is included or to be included in a specific group is shown in an environment where a plurality of terminals including terminals 1401 through 1404 belonging to the specific group are present. The terminal 1405 may receive not only a desired message 1407 from the specific group, but also unnecessary messages 1471 from other neighboring terminals. The number of unnecessary messages increases as the number of neighboring terminals 1411 through 1415 other than terminals of the specific group increases.

Figure 15:
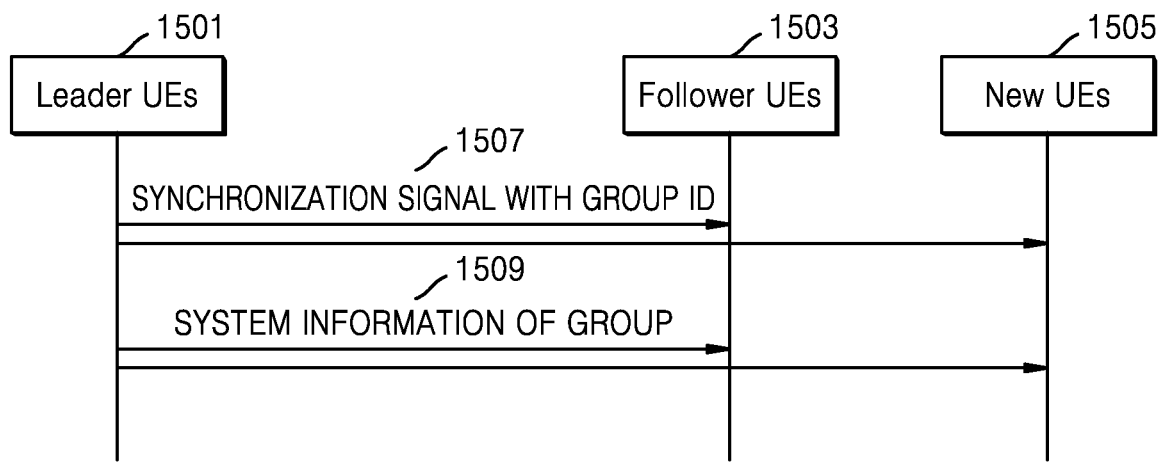
FIG. 15 is a diagram showing transmission and reception procedures of a synchronization signal and system information of a new user equipment (UE) to be included in a specific group upon receiving a signal from UEs included in the specific group and from the specific group, according to an embodiment.

FIG. 15 is a diagram showing transmission and reception procedures of a synchronization signal and system information of a new user equipment (UE) to be included in a specific group upon receiving a signal from UEs included in the specific group and from the specific group, according to an embodiment.

Referring to FIG. 15, transmission and reception procedures of a synchronization signal and system information of a new UE 1505 to be included in a specific group upon receiving a signal from UEs 1501 and 1503 included in the specific group and from the specific group are shown. A terminal that transmits a synchronization signal and system information in a group may be referred to as a leader UE 1501 or a leader node. Also, terminals that receive signals from the leader UE 1501 may be referred to as follower UEs 1503 or follower nodes. The leader UE 1501 transmits the synchronization signal that may include a first synchronization signal and a second synchronization signal. According to an embodiment, the first synchronization signal may not include information of a group ID and the second synchronization signal may include the information or a part of the information of a group ID (operation 1507). However, an embodiment is not limited thereto and the first synchronization signal may include the information of a group ID. According to an embodiment, the first synchronization signal may be a PSS and the second synchronization signal may be an SSS.

According to an embodiment, a sequence $d_{PSS}(n)$ of the first synchronization signal may be determined by Equation 1 below.

$$d_{PSS}(n)=1-2x(m)$$

$$m=+(n+43N_{ID}^{(2)})\bmod 127$$

$$0 \le n < 127 \quad \text{Equation 1}$$

Here, x(m) may be a sequence defined by $x(i+7)=(x(i+4)+x(i))\bmod 2$ and $[x(6)\ x(5)\ x(4)\ x(3)\ x(2)\ x(1)\ x(0)]=[1\ 1\ 1\ 0\ 1\ 1\ 0]$. $N_{ID}^{(2)}$ may be a pre-determined value, a value determined by a group ID, or a value arbitrarily selected by a leader UE or a part of a group ID. Also, according to an embodiment, a sequence $d_{SSS}(n)$ of the second synchronization signal may be determined by Equation 2 below.

$$d_{SSS}(n) = [1 - 2x_0((n + m_0)\bmod 27)][1 - 2x_1((n + m_1)\bmod 127)] \quad \text{Equation 2}$$

$$m_0 = 15\left\lfloor\frac{N_{ID}^{(1)}}{112}\right\rfloor + 5N_{ID}^{(2)}$$

$$m_1 = N_{ID}^{(1)}\bmod 112$$

$$0 \le n < 127$$

Here, $x_0(i)$ and $x_1(i)$ may be defined by Equations 3 and 4 below.

$$x_0(i+7)=(x_0(i+4)+x_0(i))\bmod 2$$

$$x_1(i+7)=(x_1(i+1)+x_1(i))\bmod 2 \quad \text{Equation 3}$$

$$[x_0(6)x_0(5)x_0(4)x_0(3)x_0(2)x_0(1)x_0(0)]=[0\ 0\ 0\ 0\ 0\ 0\ 1]$$

$$[x_1(6)x_1(5)x_1(4)x_1(3)x_1(2)x_1(1)x_1(0)]=[0\ 0\ 0\ 0\ 0\ 0\ 1] \quad \text{Equation 4}$$

According to an embodiment, the sequence of the second synchronization signal may use $d_{SSS}^{group}(n)$ determined by Equation 5, 6, or 7 below, instead of $d_{SSS}(n)$.

$$d_{SSS}^{group}(n)=d_{SSS}(n)\cdot(1-2c(n)) \quad \text{Equation 5}$$

$$d_{SSS}^{group}(n)=d_{SSS}(n)\cdot c'(n) \quad \text{Equation 6}$$

$$d_{SSS}^{group}(n)=[1-2x_0((n+m\bmod 127)]\cdot[1-2x_1((n+m_1) \bmod 127)]\cdot[1-2c(n)] \quad \text{Equation 7}$$

Here, $x_0(i)$ $x_1(i)$ and may be defined by Equations 3 and 4, c'(n) may be a pre-agreed specific sequence, and c(n) ≙ pseudo-random may be a sequence defined as below.

[Start c(n) Generation Method]

Generic pseudo-random sequences are defined by a length-31 Gold sequence. The output sequence c(n) of length $M_{PN}$, where n=0, 1, ..., $M_{PN}$−1, is defined by $$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$ and the first m-sequence $x_1(n)$ shall be initialized with $x_1(0)=1$, $x_1(n)=0$, n=1, 2, ..., 30. The initialization of the second m-sequence, $x_2(n)$, is denoted by $c_{init}=\Sigma_{i=0}^{30}x_2(i)\cdot 2^i$ with the value depending on the application of the sequence.

[End c(n) Generation Method]

$c_{init}$ used to generate c(n) of Equations 5 and 7 may be a value of a group ID or a value generated by using the group ID. According to an embodiment, $c_{init}$ may be a remainder obtained by dividing the group ID by a specific value, or may be a part of the group ID. For example, when the group ID is in 24 bits, only upper 16 bits of the 24 bits may be used.

The leader UE 1501 transmits system information including group information after transmitting the first and second synchronization signals (operation 1509).

Figure 16:
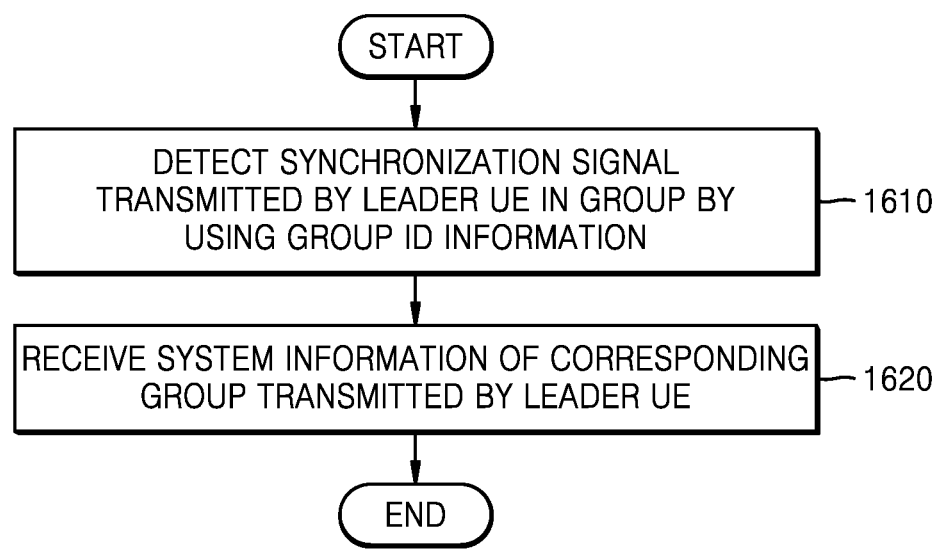
FIG. 16 is a flowchart of a method, performed by a new UE or a UE in a group, of detecting a synchronization signal from a leader UE of the group, according to an embodiment.

FIG. 16 is a flowchart of a method, performed by a new UE or a UE in a group, of detecting a synchronization signal from a leader UE of the group, according to an embodiment.

Referring to FIG. 16, first, in operation 1610, a UE detects a synchronization signal transmitted by a leader UE in a group by using group ID information. Here, the UE may include a follower UE. According to an embodiment, the UE may receive an arbitrary signal and detect the synchronization signal transmitted by the leader UE in the group from the arbitrary signal by using the group ID information. Here, the UE may detect the synchronization signal by using the method described with reference to FIG. 15.

According to an embodiment, the UE may detect a first synchronization signal and detect a second synchronization signal by using the group ID information. Such an embodiment may be applied when the first synchronization signal does not include information related to the group ID information and the second synchronization signal includes the information related to the group ID information. When the UE detects the synchronization signal by using the group ID information from when the first synchronization signal is detected, overhead may occur in the UE. Accordingly, the group ID information may not be used when the first synchronization signal is detected and the group ID information may be used when the second synchronization signal is detected. According to another embodiment, the UE may detect the first and second synchronization signals by using the group ID information. Such an embodiment may be applied when both the first and second synchronization signals include the information related to the group ID information. When the UE detects the synchronization signal by using the group ID information from when the first synchronization signal is detected, overhead may occur in the UE, but the synchronization signal transmitted by the leader UE of the group to which the UE is to belong may be further accurately distinguished. Accordingly, for further accurate distinguishment, the group ID information may be used for detecting both the first and second synchronization signals.

According to an embodiment, the group ID information may include a group ID. Here, the group ID may be a value used at a higher level that may be called Layer 2. For example, the group ID may be a value added in front of MAC data in an MAC layer to indicate a destination of transmission. Also, the group ID information may be an explicit value or information implicitly configured or obtained.

According to an embodiment, the UE may obtain the group ID information before the arbitrary signal is received. The UE may pre-store the group ID information. In this case, a process of obtaining the group ID information is not required to be performed separately, but when the UE does not pre-store the group ID information, the UE may obtain the group ID information to use the group ID information. According to an embodiment, the UE may be configured with the group ID information from a base station when connected to the base station. Alternatively, the group ID information may be obtained from the leader UE, another follower UE, or the base station before joining a group or platoon.

In operation 1620, the UE receives system information of the group transmitted by the leader UE. According to an embodiment, the UE may receive the system information by using the group ID information.

Hereinabove, operations have been described in terms of a follower UE. Hereinafter, operations will be described in terms of a leader UE.

The leader UE may transmit the synchronization signal by adding the group ID information thereto. Here, the synchronization signal may be transmitted to a specific UE, transmitted without specifying a reception UE, or broadcasted. According to an embodiment, the leader UE may add the group ID information to at least one synchronization signal from among the first synchronization signal and the second synchronization signal. Here, the group ID information may include same information as the group ID information described above. Then, the leader UE may transmit the system information of the corresponding group. According to an embodiment, the leader UE may transmit the system information by adding the group ID information thereto when transmitting the system information.

Figure 17:
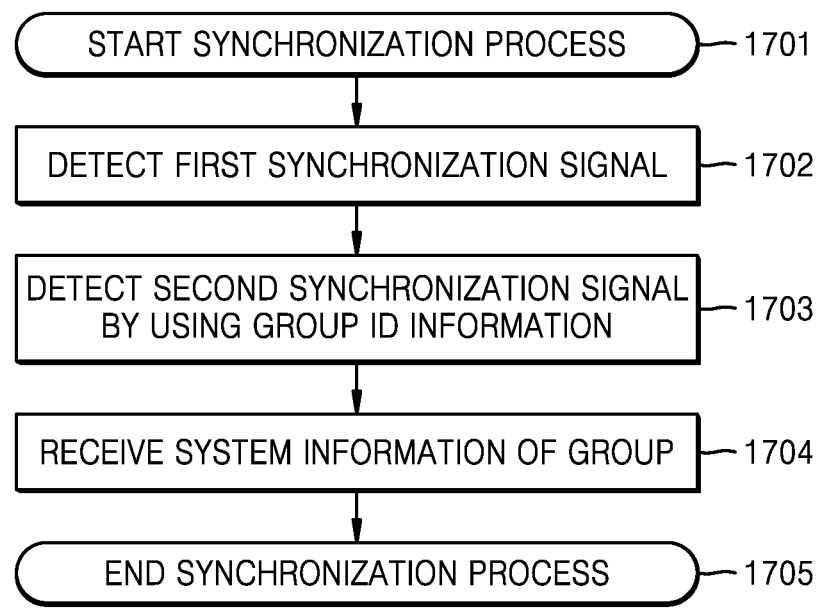
FIG. 17 is a flowchart of a method, performed by a new UE or a UE in a group, of detecting a synchronization signal from a leader UE in the group, according to another embodiment.

FIG. 17 is a flowchart of a method, performed by a new UE or a UE in a group, of detecting a synchronization signal from a leader UE in the group, according to an embodiment.

FIG. 17 is a detailed diagram of the method of detecting a synchronization signal of FIG. 16. Referring to FIG. 17, when a synchronization process starts (operation 1701), a UE detects a first synchronization signal (operation 1702). In FIG. 17, the first synchronization signal does not include information related to a group ID, but an embodiment is not limited thereto and the first synchronization signal may also include group ID information. After the first synchronization is detected, the UE detects a second synchronization signal, and here, the second synchronization signal may be detected by using the group ID information (operation 1703). According to an embodiment, when the second synchronization signal is generated and transmitted as in Equation 5, the UE may multiply a sequence of the received second synchronization signal by $(1-2c(n))$ and then detect $d_{SSS}(n)$. Next, the UE receives system information of a group (operation 1704) and ends the synchronization process (operation 1705).

According to an embodiment, the UE may synchronize with another UE in a specific group and receive the system information to communicate with other UEs in the specific group. In particular, a group ID or a part of the group ID may be masked to a CRC added behind an information bit transmitted via PBCH such that UEs other than the UE of the related group are unable to receive the PBCH.

Figure 18:
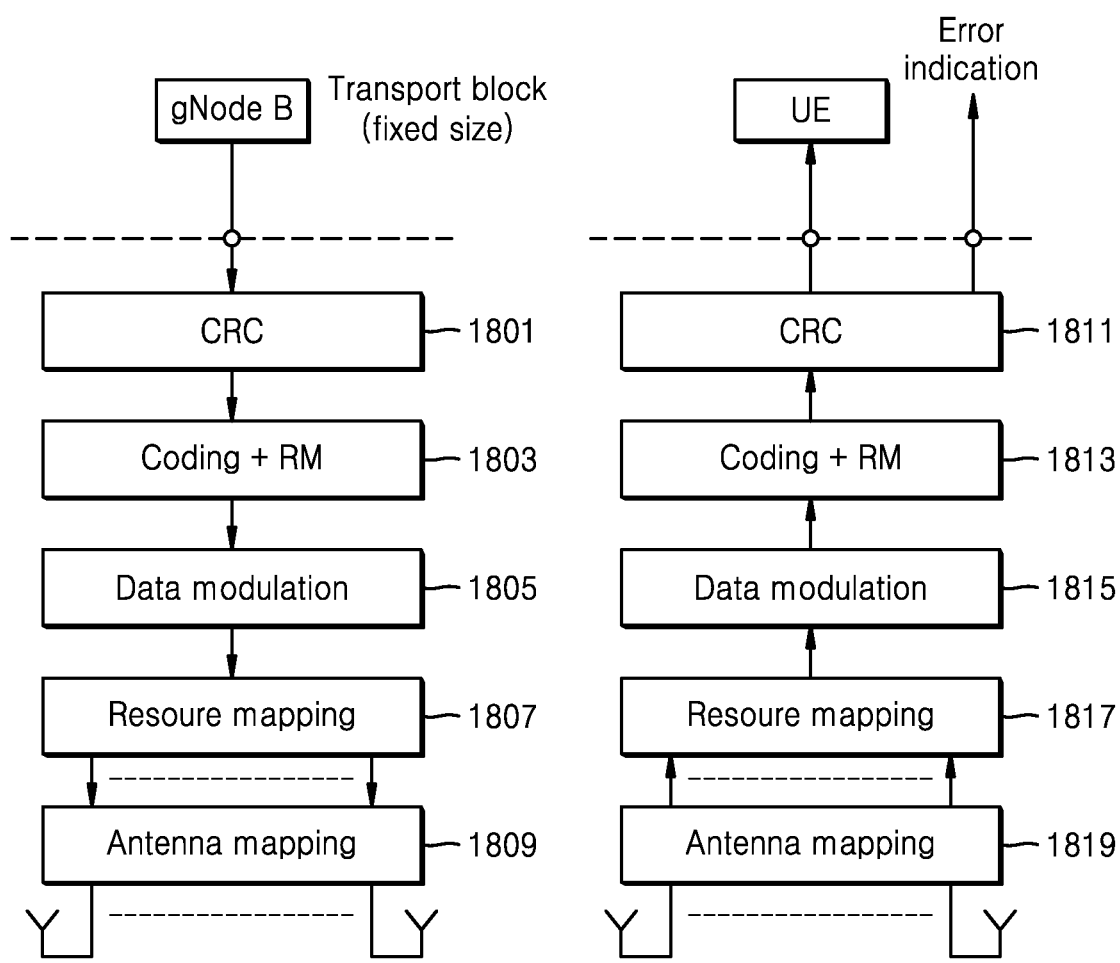
FIG. 18 is a diagram showing procedures by which a next generation node B (gNB) transmits a PBCH and a UE receives the PBCH, according to an embodiment.

FIG. 18 is a diagram showing procedures by which a next generation node B (gNB) transmits a PBCH and a UE receives the PBCH, according to an embodiment.

Referring to FIG. 18, the gNB may additionally add CRC bits to information bits transmitted from PBCH (operation 1801) and apply channel coding (operation 1803). The channel coding may be a polar code or a Reed-Muller code. Then, the information bits may be transmitted via data modulation (operation 1805), resource mapping (operation 1807), and antenna mapping (operation 1809). The UE may perform antenna mapping (operation 1819), resource mapping (operation 1818), data demodulation (operation 1815), channel coding decoding (operation 1813), and a CRC (operation 1811) during reception.

According to an embodiment, a reception end may receive only a PBCH of a specific group by using group ID information during a process of adding a CRC at a transmission end (operation 1801) and a process of a CRC at the reception end (operation 1811). According to an embodiment, the UE may release a mask (de-mask) regarding a CRC of information received via the PBCH by using the group ID information. Here, the mask may be applied to at least a part, i.e., all or a part of the CRC. When the mask is applied to the part of the CRC, masking may not be not performed or 0 may be masked on a remaining part of the CRC to which the mask is not applied. According to an embodiment, the mask may include a group ID.

Figure 19:
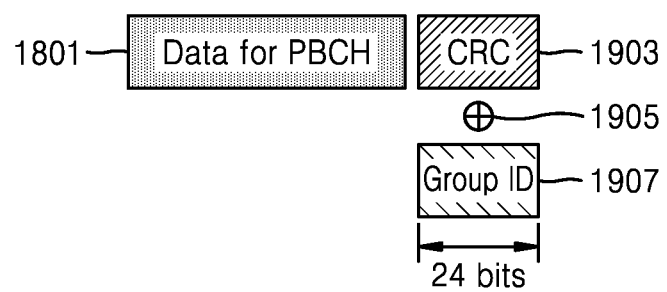
FIG. 19 is a diagram for describing a method of masking information of a group identification (ID) to a CRC attached to information of a PBCH, according to an embodiment.

FIG. 19 is a diagram for describing a method of masking information of a group ID) to a CRC attached to information of a PBCH, according to an embodiment.

Referring to FIG. 19, 16 bits or a longer bits, for example, 24 bits, of a CRC are added to a last portion of data information included in the PBCH (operation 1903), and by performing an XOR operation on the CRC (operation 1905), 24 bits of group ID value of a portion of the group ID corresponding to 24 bits are added (operation 1907). The group ID value is used to distinguish UEs or groups. According to an embodiment, the UE knows its group ID or a group ID value of a group to be received, and the group ID value may be used to detect a control signal for system information transmission of the corresponding group. The group ID being used to detect PBCH and control information may indicate that when a CRC is performed after decoding the PBCH, the CRC is performed on a result of de-masking using the group ID value to check a success. In the present disclosure, the masking may indicate a process of calculating a new value via an XOR operation.

FIG. 20A to 20D show diagrams for describing a method of masking information of a group ID to a part of CRC attached to information of a PBCH, according to an embodiment.

Figure 20A:
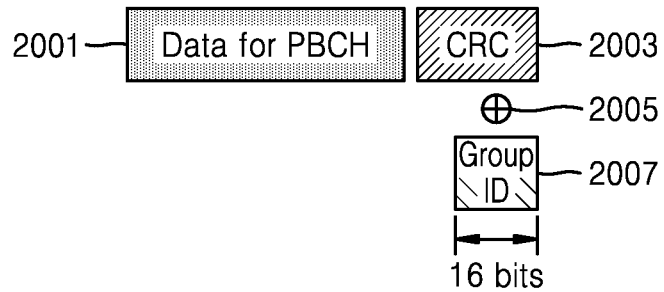
FIG. 20A to 20D show diagrams for describing a method of masking information of a group ID to a part of a CRC attached to information of a PBCH, according to an embodiment.
Figure 20B:
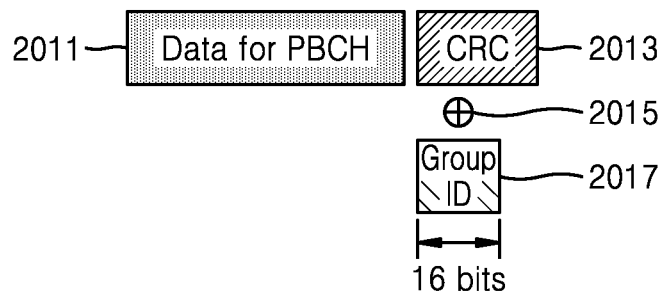
Figure 20C:
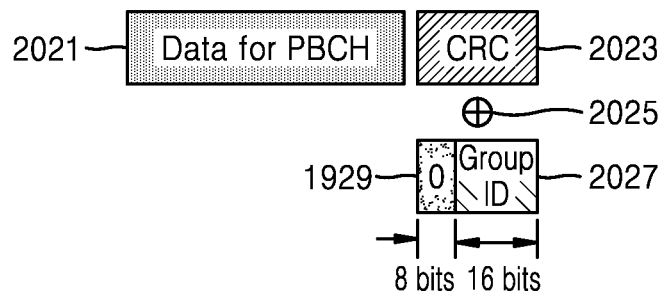
Figure 20D:
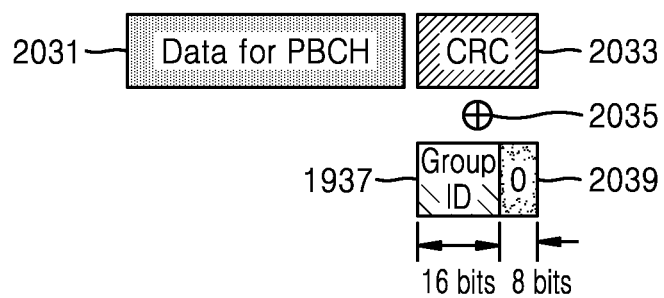

Referring to FIG. 20A, an example of masking (operation 2005) an end portion of a CRC 2003 with a group ID 2007 or a part of the group ID 2007 is illustrated. Referring to FIG. 20B, an example of masking (operation 2015) a front portion of a CRC 2013 with a group ID 2017 or a part of the group ID 2017 is illustrated. Referring to FIG. 20C, an example of masking (operation 2025) an end portion of a CRC 2023 with a group ID 2027 or a part of the group ID 2027 and masking remaining portion of the CRC 2023 with 0 1929 is illustrated, and FIG. 20C may derive a same result as FIG. 20A. Referring to FIG. 20D, an example of masking (operation 2035) a from portion of a CRC 2033 with a group ID 1937 or a part of the group ID 2037 and masking remaining portion of the CRC 2033 with 0 2039 is illustrated, and FIG. 20D may derive a same result as FIG. 20B.

According to an embodiment, a specific UE may generate a new group or platoon for group or platoon communication. This will be described with reference to FIG. 21A to 21B.

FIG. 21 show diagrams of processes by which a specific node generates a new group or platoon, according to an embodiment.

Figure 21A:
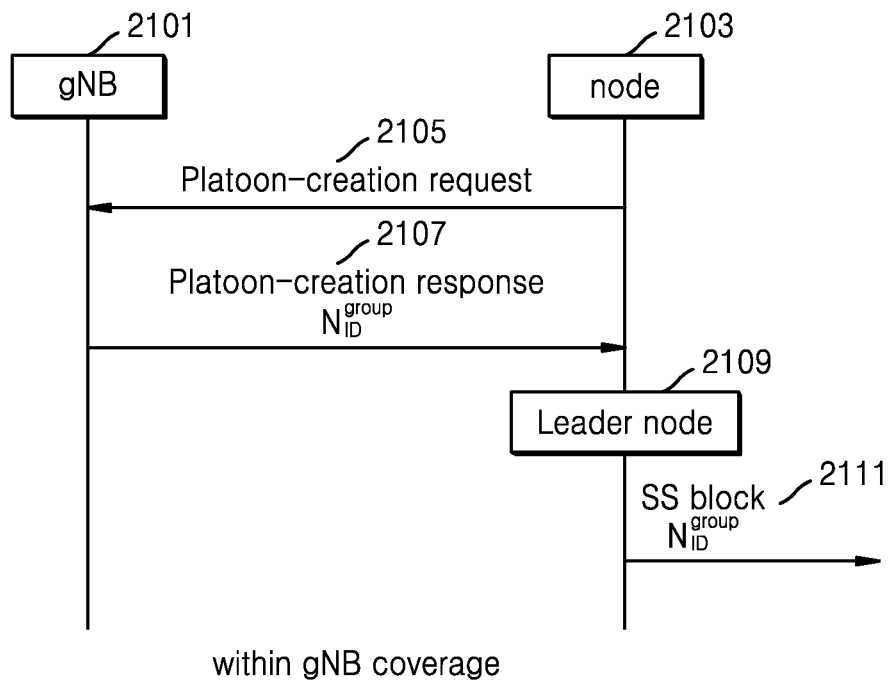
FIG. 21A to 21B show diagrams of processes by which a specific node generates a new group or platoon, according to an embodiment.
Figure 21B:
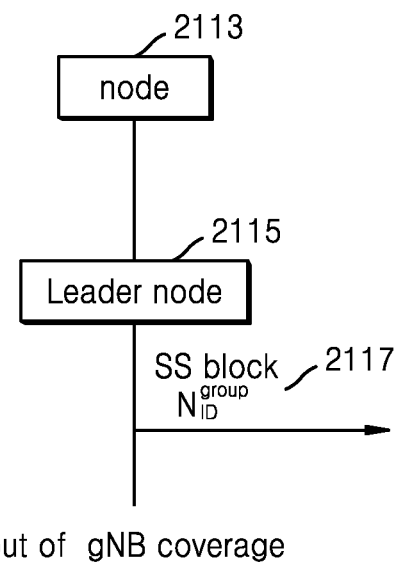

In the present disclosure, a group or platoon may be collectively referred to as a platoon. Referring to FIG. 21A, a platoon may be generated via control of a gNB within a coverage of the gNB. One node 2103 transmits a platoon-creation request to a gNB 2101 (operation 2105). A platoon-creation request signal may be considered as data in a physical layer or may be transmitted by using a control channel in the physical layer. Upon receiving the platoon-creation request, the gNB transmits a platoon-creation response signal, together with group ID information, to a corresponding UE (operation 2107). The platoon-creation response signal may denote a confirmation response to the platoon-creation request signal. Upon receiving the platoon-creation response signal (operation 2107), the node 2103 may become a leader node of a corresponding platoon (operation 2109). Then, the corresponding node may use the group ID information to transmit a SS/PBCH block to the surroundings (operation 2111). In the present disclosure, the SS/PBCH block may be referred to as a SS block. Referring to FIG. 21B, a platoon may be generated without control of a gNB outside a coverage of the gNB. When one node 2113 determines to generate a platoon, the node 2113 becomes a leader node (operation 2115) and transmits a SS/PBCH block to the surroundings by using group ID information that is already known and usable (operation 2117).

According to an embodiment, a specific terminal may access or join a new group or platoon for group or platoon communication. This will be described with reference to FIGS. 22A through 22C.

Figure 22A:
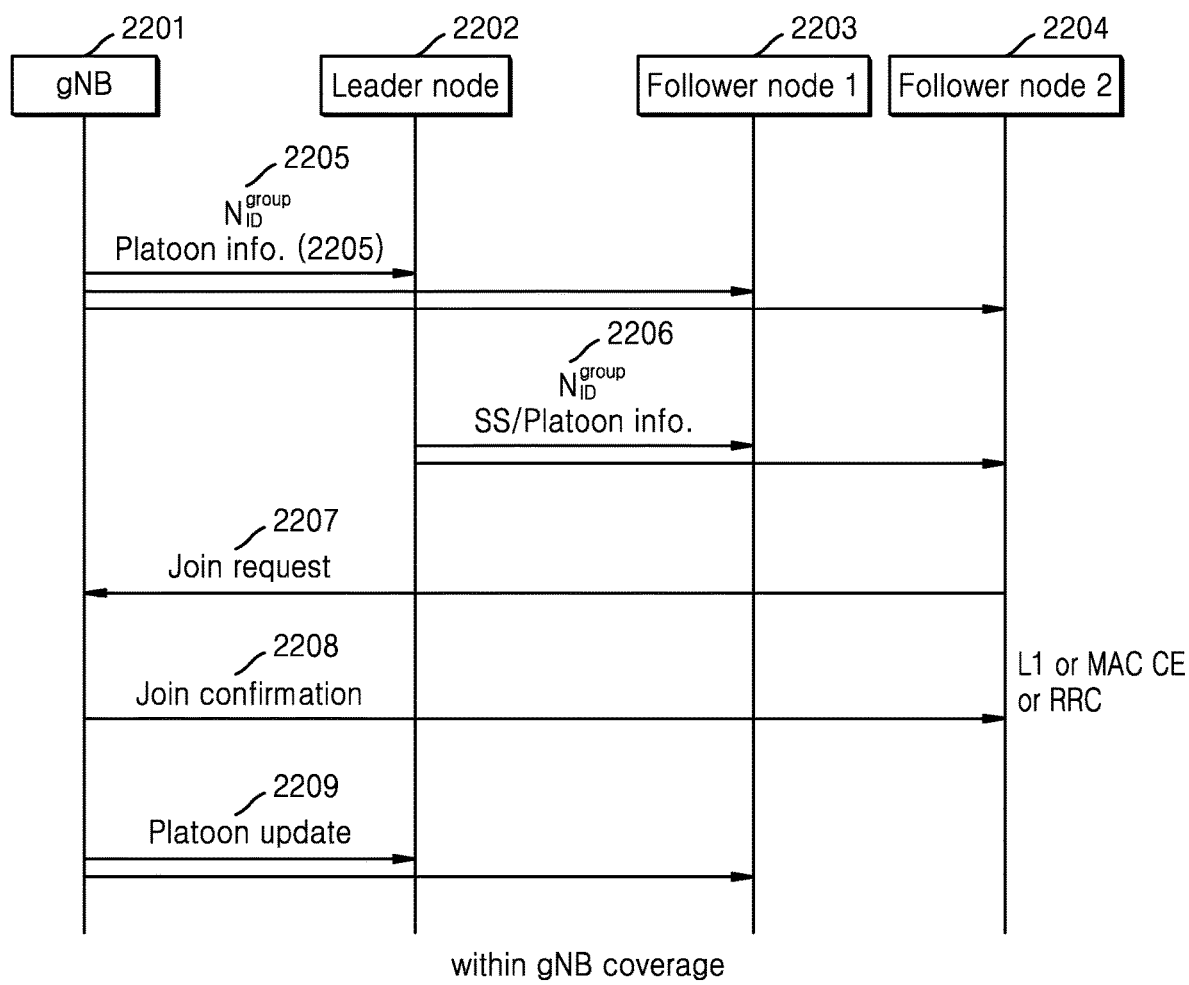
FIG. 22A is a diagram showing processes of joining a platoon according to control of a gNB within a coverage of the gNB.
Figure 22B:
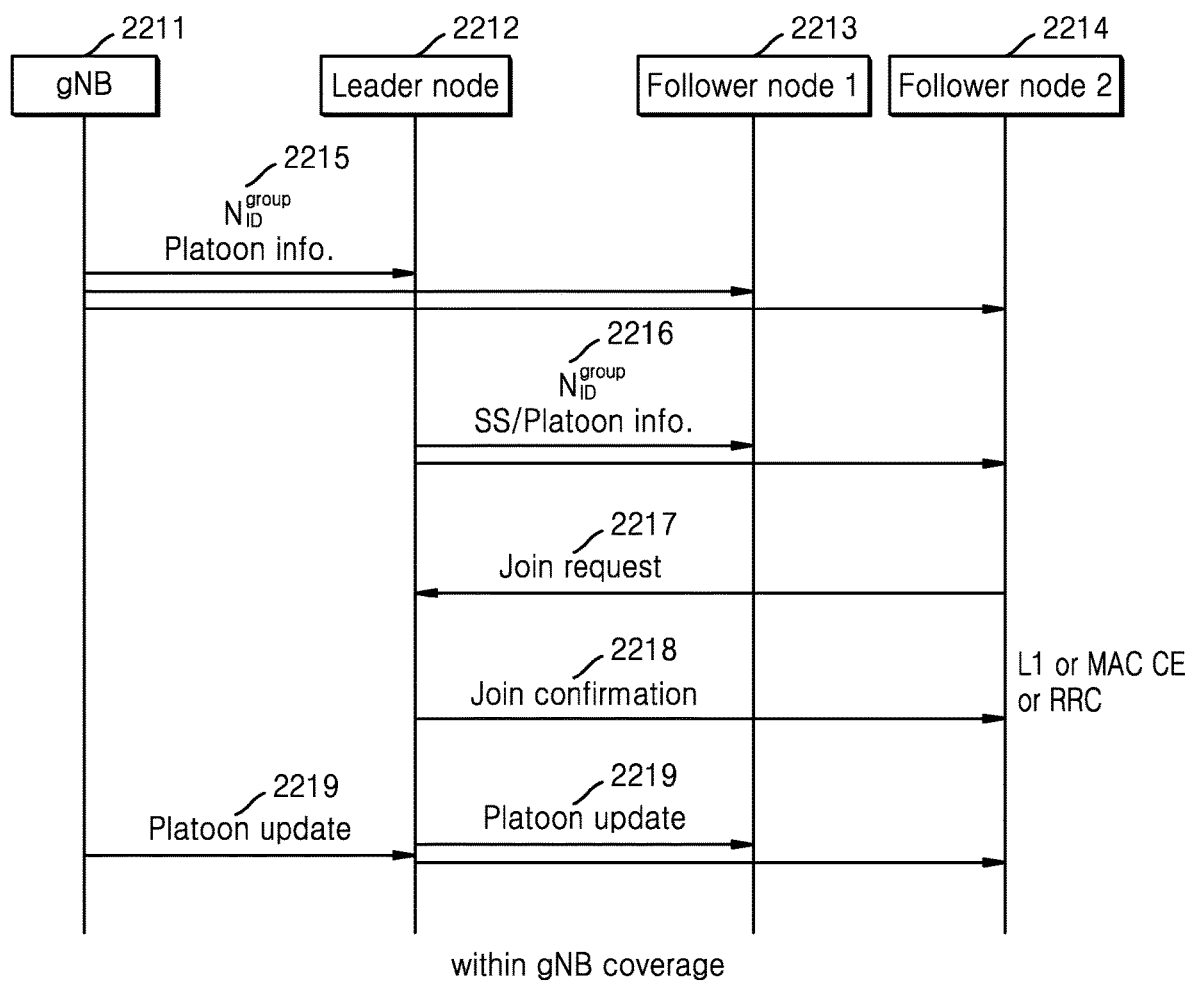
FIG. 22B is a diagram showing processes of joining a platoon according to control of a gNB within a coverage of the gNB.
Figure 22C:
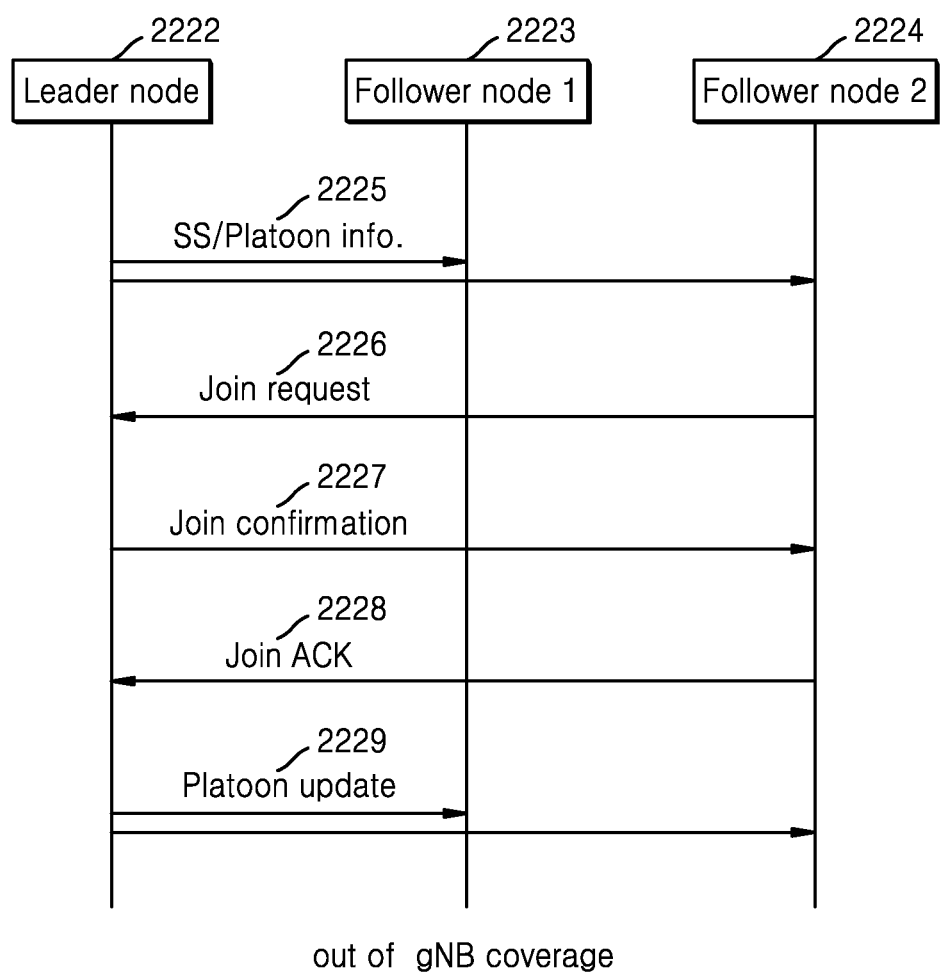
FIG. 22C is a diagram showing processes of joining a platoon without control of a gNB outside a coverage of the gNB.

FIGS. 22A through 22C are diagrams showing a method by which a specific node searches for existence of a platoon around and joins the platoon, according to an embodiment.

FIG. 22A is a diagram showing processes of joining a platoon according to control of a gNB within a coverage of the gNB. The gNB transmits information related to the platoon to UEs 2202 through 2204 (operation 2205). The information related to the platoon may include a group ID of the corresponding platoon. Then, a leader node 2202 of the corresponding platoon transmits a SS/PBCH block to neighboring UEs by using group ID information of the platoon (operation 2206). According to an embodiment, a follower node 1 2203 may be a node that already joined the platoon and a follower node 2 2204 may be a UE that is to join the platoon. Upon receiving the SS/PBCH block of the platoon, the UE 2204 transmits, to the gNB, a join request signal for joining the corresponding platoon (operation 2207). The join request signal may be transmitted via a physical control channel or a physical data channel. Upon receiving the join request signal, the gNB 2201 transmits, to the UE 2204, a join confirmation signal for joining the corresponding platoon (operation 2208). Then, the gNB transmits, to UEs in the corresponding platoon, platoon update information including information that the new node 2204 jointed the corresponding platoon (operation 2209). The join request signal and the join confirmation signal may be transmitted via physical layer signal, MAC CE, or RRC signaling.

FIG. 22B is a diagram showing processes of joining a platoon according to control of a gNB within a coverage of the gNB. Unlike FIG. 22A, a leader node 2212 of a corresponding platoon transmits and receives a join request signal and a join confirmation signal, instead of a gNB. The gNB transmits information related to the platoon to UEs 2212 through 2214 (operation 2215). The information related to the platoon may include a group ID of the corresponding platoon. The leader node 2212 of the corresponding platoon transmits a SS/PBCH block to neighboring UEs by using group ID information of the platoon (operation 2216). According to an embodiment, a follower node 1 2213 may be a node that already joined the platoon and a follower node 2 2214 may be a UE that is to join the platoon. Upon receiving the SS/PBCH block of the platoon, the UE 2214 transmits, to the leader node 2212, a join request signal for joining the corresponding platoon (operation 2217). The join request signal may be transmitted via a physical control channel or a physical data channel. Upon receiving the join request signal, the leader node 2212 transmits, to the UE 2214, a join confirmation signal for joining the corresponding platoon (operation 2218). Then, the leader node 2212 transmits, to UEs and gNB in the corresponding platoon, platoon update information including information that the new node 2214 jointed the corresponding platoon (operation 2219). The join request signal and the join confirmation signal may be transmitted via physical layer signal, MAC CE, or RRC signaling.

FIG. 22C is a diagram showing processes of joining a platoon without control of a gNB outside a coverage of the gNB. Accordingly, a leader node 2222 of a corresponding platoon transmits and receives a join request signal and a join confirmation signal, instead of a gNB. The leader node 2222 of the corresponding platoon transmits a SS/PBCH block to neighboring UEs by using group ID information of the platoon, which is already known by the UEs (operation 2225). According to an embodiment a follower node 1 2223 may be a node that already joined the platoon and a follower node 2 2224 may be a UE that is to join the platoon. Upon receiving the SS/PBCH block of the platoon, the UE 2224 transmits, to the leader node 2222, a join request signal for joining the corresponding platoon (operation 2226). The join request signal may be transmitted via a physical control channel or a physical data channel. Upon receiving the join request signal, the leader node 2222 transmits, to the UE 2224, a join confirmation signal for joining the corresponding platoon (operation 2227). Then, the newly joined UE 2224 transmits, to the leader node 2222, feedback information indicating that the join confirmation signal is received (operation 2228). Then, the leader node 2222 transmits, to UEs in the corresponding platoon, platoon update information including information that the new node 2224 jointed the corresponding platoon (operation 2229). The join request signal and the join confirmation signal may be transmitted via physical layer signal, MAC CE, or RRC signaling.

Embodiments described above may be individually implemented or some or all of the embodiments may be implemented in a combination. For example, a synchronization signal may be detected by using a group ID and then a CRC of a PBCH may be de-masked by using the group ID. This is an example of combining embodiments and it is possible to combine and implement some or all of other embodiments within a scope that is obvious to one of ordinary skill in the art.

Figure 23:
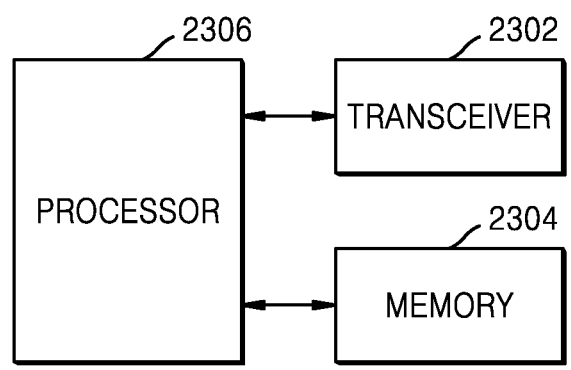
FIG. 23 is a diagram of an internal structure of a terminal according to an embodiment.

FIG. 23 is a diagram of an internal structure of a terminal according to an embodiment.

Referring to FIG. 23, the terminal may include a transceiver 2302, a memory 2304, and a processor 2306. The transceiver 2302, the memory 2304, and the processor 2306 of the terminal may operate according to a communication method of the terminal described above. However, the components of the terminal are not limited thereto. For example, the terminal may include more or fewer components than those described above. In addition, the transceiver 2302, the memory 2304, and the processor 2306 may be implemented as a single chip.

The transceiver 2302 may transmit or receive a signal to or from a base station. Here, the signal may include control information and data. In this regard, the transceiver 2302 may include a RF transmitter for up-converting and amplifying a frequency of a transmitted signal, and a RF receiver for amplifying low-noise and down-converting a frequency of a received signal. However, this is only an embodiment of the transceiver 2302 and components of the transceiver 2302 are not limited to the RF transmitter and the RF receiver.

Also, the transceiver 2302 may receive and output, to the processor 2306, a signal through a wireless channel, and transmit a signal output from the processor 2306 through the wireless channel.

The memory 2304 may store a program and data required for operations of the terminal. Also, the memory 2304 may store control information or data included in a signal obtained by the terminal. The memory 2304 may be a storage medium, such as read-only memory (ROM), random access memory (RAM), a hard disk, a CD-ROM, and a DVD, or a combination of storage media. Also, the memory 2304 may be configured in a plurality of memories. According to an embodiment, the memory 2304 may store a program for supporting beam-based cooperative communication.

The processor 2306 may control a series of processes such that the terminal operates as described above. According to an embodiment, the processor 2306 may detect a synchronization signal transmitted by a leader UE in a group by using group ID information, and receive system information of the group transmitted by the leader UE. According to an embodiment, the processor 2306 may receive a SS/PBCH block and the group ID information from a base station through the transceiver 2302, perform decoding of the SS/PBCH block by using the group ID information, and perform signal processing accordingly. Then, a join request signal related to a platoon or the like may be transmitted to the base station through the transceiver 2302. Here, only some operations from among the embodiments described above are described in relation to operations of the processor 2306, but the operations are not limited thereto and the processor 2306 may control all processes enabling the terminal to operate according to all or some of the embodiments described above.

Figure 24:
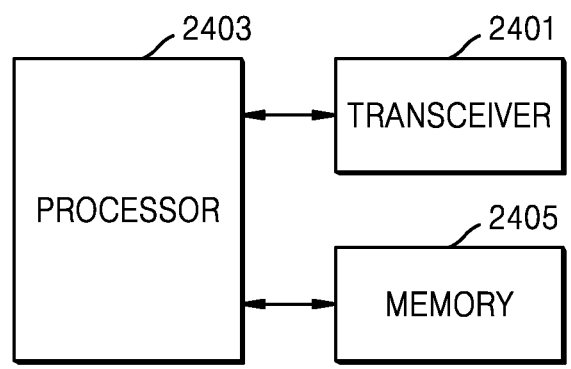
FIG. 24 is a diagram of an internal structure of a base station according to an embodiment.

FIG. 24 is a diagram of an internal structure of a base station according to an embodiment.

Referring to FIG. 24 the base station may include a transceiver 2401, a memory 2405, and a processor 2403. The transceiver 2401, the memory 2405, and the processor 2403 of the base station may operate according to a communication method of the base station described above. However, the components of the base station are not limited thereto. For example, the base station may include more or fewer components than those described above. In addition, the transceiver 2401, the memory 2405, and the processor 2403 may be implemented as a single chip.

The transceiver 2401 may transmit or receive a signal to or from a terminal. Here, the signal may include control information and data. In this regard, the transceiver 2401 may include a RF transmitter for up-converting and amplifying a frequency of a transmitted signal, and a RF receiver for amplifying low-noise and down-converting a frequency of a received signal. However, this is only an embodiment of the transceiver 2401 and components of the transceiver 2401 are not limited to the RF transmitter and the RF receiver.

Also, the transceiver 2401 may receive and output, to the processor 2403, a signal through a wireless channel, and transmit a signal output from the processor 2403 through the wireless channel.

The memory 2405 may store a program and data required for operations of the base station. Also, the memory 2405 may store control information or data included in a signal obtained by the base station. The memory 2405 may be a storage medium, such as read-only memory (ROM), random access memory (RAM), a hard disk, a CD-ROM, and a DVD, or a combination of storage media. Also, the memory 2405 may be configured in a plurality of memories. According to an embodiment, the memory 2405 may store a program for supporting beam-based cooperative communication.

The processor 2403 may control a series of processes such that the base station operates as described above. According to an embodiment, the processor 2403 may control a series of processes to operate the base station. In particular, the processor 2403 may transmit a generated SS/PBCH block through the transceiver 2401 and the transceiver 2401 may receive, from terminals, a join request signal related to a platoon or the like. Here, only some operations from among the embodiments described above are described in relation to operations of the processor 2403, but the operations are not limited thereto and the processor 2403 may control all processes enabling the base station to operate according to all or some of the embodiments described above.

The methods according to the embodiments described in the claims or the detailed description of the present disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment and a portion of another embodiment of the present disclosure may be combined with each other to enable a base station and a terminal to operate. In addition, the embodiments may be implemented in other communication systems with other modifications based on the technical idea of the embodiments.

Meanwhile, the embodiments described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment of the disclosure and a portion of another embodiment of the present disclosure may be combined with each other. In addition, modified examples of the embodiments based on the technical ideas of the embodiments may be implemented in other systems, such as LTE systems, 5G or NR communication systems.

The invention claimed is:

1. A method performed by a terminal in a wireless communication system, the method comprising:
   obtaining terminal group identification information of a terminal group, wherein the terminal group comprises a plurality of terminals including a leader terminal performing groupcast;
   receiving, from the leader terminal in the terminal group, a primary synchronization signal (PSS) and a secondary synchronization signal (SSS), wherein the receiving of the PSS and the SSS comprises:
      detecting the PSS based on a sequence for the PSS, wherein the sequence for the PSS is obtained based on a pre-determined value, and
      detecting the SSS based on a first sequence for the SSS, wherein the first sequence for the SSS is obtained based on a pseudo random sequence and an initial value for the pseudo random sequence is based on the terminal group identification information; and
   based on the detecting of the PSS and the detecting of the SSS, receiving, from the leader terminal, system information of the terminal group.

2. The method of claim 1, wherein the terminal group identification information comprises a group identifier (ID).

3. The method of claim 2, wherein the first sequence for the SSS is obtained based on a second equation, and
   wherein the second equation is $d_{SSS}^{group}(n)=d_{SSS}(n)\cdot(1-2c(n))$, and the $d_{SSS}^{group}(n)$ refers to the first sequence for the SSS, $d_{SSS}(n)$ refers to a second sequence for the SSS, $c(n)$ refers to the pseudo random sequence, n refers to an integer greater than or equal to 0 and less than 127, and the initial value for the pseudo random sequence is obtained based on the group ID.

4. The method of claim 3, wherein the second sequence for the SSS is obtained based on $d_{SSS}(n)[1-2x_0(m)((n+m_0) \mod 127)][1-2x_1((n+m_1) \mod 127)]$, where $$m_0 = 15\left\lfloor \frac{NID^{(2)}}{112} \right\rfloor + 5NID^{(2)},$$

$m_1=NID^{(1)} \mod 112$, $NID^{(1)}$ refers to a first value determined based on the group ID, $NID^{(2)}$ refers to a second value determined based on the group ID, $x_0(m)$ refers to a sequence determined based on $x_0(i+7)=(x_0(i+4)+x_0(i)) \mod 2$, $\{x_0(6), x_0(5), x_0(4), x_0(3), x_0(2), x_0(1), x_0(0)\}=\{0, 0, 0, 0, 0, 0, 1\}$, $x_1(m)$ refers to a sequence determined based on $x_1(i+7)=(x_1(i+1)+x_1(i)) \mod 2$ and $\{x_1(6), x_1(5), x_1(4), x_1(3), x_1(2), x_1(1), x_1(0)\}=\{0, 0, 0, 0, 0, 0, 1\}$.

5. The method of claim 1, further comprising:
   masking a cyclic redundancy check (CRC) of information received via a physical broadcast channel by using the terminal group identification information.

6. The method of claim 5, wherein a mask is applied to at least a part of the CRC.

7. The method of claim 6, wherein the masking is not performed or 0 is masked on a remaining part of the CRC to which the mask is not applied.

8. The method of claim 5, wherein the mask comprises a group identifier (ID).

9. The method of claim 1,
   wherein the sequence for the PSS is obtained based on a first equation, and
   wherein the first equation is $dPSS(n)=1-2x(m)$, where the $dPSS(n)$ refers to the sequence for the PSS, n refers to an integer greater than or equal to 0 and less than 127, $m=(n+43NID) \mod 127$, NID refers to the pre-determined value, $x(m)$ refers to a sequence determined based on $x(i+7)=(x(i+4)+x(i))) \mod 2$ and $\{x(6), x(5), x(4), x(3), x(2), x(1), x(0)\}=\{1, 1, 1, 0, 1, 1, 0\}$.

10. A terminal in a wireless communication system, the terminal comprising:
    a transceiver; and
    a processor coupled with the transceiver and configured to:
       obtain terminal group identification information of a terminal group, wherein the terminal group comprises a plurality of terminals including a leader terminal performing groupcast,
       receive, from the leader terminal in the terminal group, a primary synchronization signal (PSS) and a secondary synchronization signal (SSS), wherein the receiving of the PSS and the SSS comprises:
          detecting the PSS based on a sequence for the PSS, wherein the sequence for the PSS is obtained based on a pre-determined value, and
          detecting the SSS based on a first sequence for the SSS, wherein the first sequence for the SSS is obtained based on a pseudo random sequence and an initial value for the pseudo random sequence is based on the terminal group identification information, and
       based on the detecting of the PSS and the detecting of the SSS, receive, from the leader terminal, system information of the terminal group.

11. The terminal of claim 10, wherein the terminal group identification information comprises a group identifier (ID).

12. The terminal of claim 10, wherein the processor is further configured to:
    mask a cyclic redundancy check (CRC) of information received via a physical broadcast channel by using the terminal group identification information.

13. The terminal of claim 12, wherein a mask is applied to at least a part of the CRC.

14. The terminal of claim 13, wherein the masking is not performed or 0 is masked on a remaining part of the CRC to which the mask is not applied.

15. The terminal of claim 10,
    wherein the sequence for the PSS is obtained based on a first equation, and
    wherein the first equation is $dPSS(n)=1-2x(m)$, where the $dPSS(n)$ refers to the sequence for the PSS, n refers to an integer greater than or equal to 0 and less than 127, $m=(n+43NID)\bmod 127$, NID refers to the pre-determined value, $x(m)$ refers to a sequence determined based on $x(i+7)=(x(i+4)+x(i))\bmod 2$ and $\{x(6), x(5), x(4), x(3), x(2), x(1), x(0)\}=\{1, 1, 1, 0, 1, 1, 0\}$.

16. The terminal of claim 10, wherein the first sequence for the SSS is obtained based on a second equation, and wherein the second equation is $d_{SSS}^{group}(n)=d_{SSS}(n)\cdot(1-2c(n))$, and the $d_{SSS}^{group}(n)$ refers to the first sequence for the SSS, $d_{SSS}(n)$ refers to a second sequence for the SSS, $c(n)$ refers to the pseudo random sequence, n refers to an integer greater than or equal to 0 and less than 127, and the initial value for the pseudo random sequence is obtained based on the group ID.

17. The terminal of claim 16, wherein the second sequence for the SSS is obtained based on $d_{SSS}(n)[1-2x_0(m)((n+m_0)\bmod 127)][1-2x_1((n+m_1)\bmod 127)]$, where $$m_0 = 15\left\lfloor\frac{NID^{(1)}}{112}\right\rfloor + 5NID^{(2)},$$

$m_1=NID^{(1)}\bmod 112$, $NID^{(1)}$ refers to a first value determined based on the group ID, $NID^{(2)}$ refers to a second value determined based on the group ID, $x_0(m)$ refers to a sequence determined based on $x_0(i+7)=(x_0(i+4)+x_0(i))\bmod 2$, $\{x_0(6), x_0(5), x_0(4), x_0(3), x_0(2), x_0(1), x_0(0)\}=\{0, 0, 0, 0, 0, 0, 1\}$, $x_1(m)$ refers to a sequence determined based on $x_1(i+7)=(x_1(i+1)+x_1(i))\bmod 2$ and $\{x_1(6), x_1(5), x_1(4), x_1(3), x_1(2), x_1(1), x_1(0)\}=\{0, 0, 0, 0, 0, 0, 1\}$.

* * * * *